United States Patent
Woody

(10) Patent No.: US 12,447,188 B2
(45) Date of Patent: Oct. 21, 2025

(54) COMPOSITIONS AND METHODS FOR THE ANTISEPTIC TREATMENT OF BIOFILMS ON MAMMALIAN TISSUE

(71) Applicant: Avadim Health IP, Inc., Asheville, NC (US)

(72) Inventor: Stephen Thomas Woody, Asheville, NC (US)

(73) Assignee: Avadim Holdings, Inc., Asheville, NC (US)

( * ) Notice: Subject to any disclaimer, the term of this patent is extended or adjusted under 35 U.S.C. 154(b) by 0 days.

(21) Appl. No.: 16/900,863

(22) Filed: Jun. 12, 2020

(65) Prior Publication Data

US 2021/0244785 A1   Aug. 12, 2021

Related U.S. Application Data

(60) Provisional application No. 62/860,727, filed on Jun. 12, 2019.

(51) Int. Cl.

| | |
|---|---|
| *A61K 36/886* | (2006.01) |
| *A61K 9/00* | (2006.01) |
| *A61K 31/4166* | (2006.01) |
| *A61K 47/02* | (2006.01) |
| *A61K 47/10* | (2017.01) |
| *A61K 47/12* | (2006.01) |
| *A61K 47/18* | (2017.01) |
| *A61K 47/22* | (2006.01) |
| *A61K 47/24* | (2006.01) |
| *A61K 47/26* | (2006.01) |
| *A61K 47/34* | (2017.01) |
| *A61P 31/02* | (2006.01) |

(52) U.S. Cl.
CPC .......... *A61K 36/886* (2013.01); *A61K 9/0053* (2013.01); *A61K 31/4166* (2013.01); *A61K 47/02* (2013.01); *A61K 47/10* (2013.01); *A61K 47/12* (2013.01); *A61K 47/183* (2013.01); *A61K 47/186* (2013.01); *A61K 47/22* (2013.01); *A61K 47/24* (2013.01); *A61K 47/26* (2013.01); *A61K 47/34* (2013.01); *A61P 31/02* (2018.01)

(58) Field of Classification Search
None
See application file for complete search history.

(56) References Cited

U.S. PATENT DOCUMENTS

| | | | |
|---|---|---|---|
| 3,557,006 A | 1/1971 | Ferrara | |
| 4,784,647 A | 11/1988 | Gross | |
| 5,362,442 A * | 11/1994 | Kent | A61L 2/0035 426/240 |
| 5,702,992 A | 12/1997 | Martin et al. | |
| 5,902,283 A | 5/1999 | Darouiche et al. | |
| 5,945,409 A | 8/1999 | Crandall | |
| 6,231,875 B1 | 5/2001 | Sun et al. | |
| 6,346,216 B1 * | 2/2002 | Kent | A61L 2/0035 422/22 |
| 6,358,516 B1 * | 3/2002 | Harod | A61K 8/0208 424/766 |
| 6,498,157 B2 | 12/2002 | Sodemann | |
| 6,579,543 B1 | 6/2003 | McClung | |
| 7,635,358 B2 | 12/2009 | Tan | |
| 7,947,021 B2 | 5/2011 | Bourne et al. | |
| 7,985,832 B2 * | 7/2011 | Melgarejo | A61P 33/02 530/300 |
| 8,044,325 B1 | 10/2011 | Cooper | |
| 8,127,922 B2 | 3/2012 | Nordholm et al. | |
| 8,328,792 B2 | 12/2012 | Nishtala et al. | |
| 8,414,547 B2 | 4/2013 | DiFiore et al. | |
| 9,072,292 B2 | 7/2015 | Cavitt et al. | |
| 9,127,045 B2 | 9/2015 | Goodman et al. | |
| 9,446,090 B2 | 9/2016 | Bevilacqua et al. | |
| 9,549,905 B2 | 1/2017 | Taylor et al. | |
| 9,717,757 B1 | 8/2017 | Gasque, Jr. | |
| 10,046,137 B2 | 8/2018 | Woody | |
| 10,071,052 B2 | 9/2018 | Woody | |
| 11,116,712 B2 * | 9/2021 | Diaz Gomez | A61K 8/4973 |
| 2002/0058010 A1 | 5/2002 | Picard-Lesboueyries et al. | |
| 2002/0103092 A1 | 8/2002 | Tashjian et al. | |

(Continued)

FOREIGN PATENT DOCUMENTS

| | | |
|---|---|---|
| AU | 2015218703 A1 | 9/2016 |
| BR | 112017010557 A2 | 12/2017 |

(Continued)

OTHER PUBLICATIONS

Lalitha et al. (Antimicrobial Efficacy of Preservatives used in Skin Care Products on Skin Micro Biota, International Journal of Science and Research, vol. 4 Issue 6, Jun. 2015) (Year: 2015).*
And IAEA (Trends in Radiation Sterilization of Health Care Products, 2008) (Year: 2008).*
International Search Report and Written Opinion of PCT Application No. PCT/US2020/037635 mailed Nov. 2, 2010.
Reasons for Refusal in JP Application No. 2016-570926 dated Aug. 1, 2017.
FirstHealth Moore Regional Hospital, Pinehurst, NC; Aug.-Oct. 2013; https://www.hpnonline.com/inside/2014-04/1404-IP-Success.html.
American National Standards Institute, Inc. "Sterlization of health care products-Requirements and guidance for selecting a sterility assurance level (ASL) for products labeled sterile"; Approved Apr. 11, 2011 and reaffirmed Jul. 18, 2017 by American National Standards Institute, Inc. pp. 23.

(Continued)

*Primary Examiner* — Melissa S Mercier
(74) *Attorney, Agent, or Firm* — McGuireWoods LLP

(57) ABSTRACT

Compositions and methods for providing the hybrid benefit of treating biofilms on the surface of mammalian tissue, especially biofilms that occur in association with chronic wounds and burns, and simultaneously providing an antiseptic cleansing and maintenance of the stratum corneum of the tissue and other tissue surfaces, and an opportunity for the tissue to improve by engaging its own natural barrier and immunological defense properties. The compositions and methods prevent the re-establishment of biofilms by facilitating the reduction or eradication of the pathogen producing the biofilm before the biofilm can be established.

6 Claims, 5 Drawing Sheets

(56) References Cited

U.S. PATENT DOCUMENTS

| | | |
|---|---|---|
| 2005/0281820 A1 | 12/2005 | Hicks et al. |
| 2006/0074029 A1 | 4/2006 | Leece |
| 2007/0071705 A1 | 3/2007 | De Oliveira et al. |
| 2007/0093555 A1 | 4/2007 | Shudo et al. |
| 2007/0160559 A1 | 7/2007 | Roszell |
| 2007/0196454 A1 | 8/2007 | Stockman et al. |
| 2007/0212381 A1 | 9/2007 | DiFiore et al. |
| 2007/0224288 A1 | 9/2007 | Kim |
| 2007/0244449 A1 | 10/2007 | Najafi et al. |
| 2007/0281897 A1 | 12/2007 | Karaolis |
| 2008/0236631 A1 | 10/2008 | Lin et al. |
| 2008/0275113 A1 | 11/2008 | Huetter et al. |
| 2009/0053275 A1 | 2/2009 | Paul |
| 2009/0221989 A1 | 9/2009 | Najafi et al. |
| 2010/0055138 A1 | 3/2010 | Margulies et al. |
| 2010/0096287 A1 | 4/2010 | Stoesz et al. |
| 2010/0145251 A1 | 6/2010 | Polaschegg |
| 2010/0209535 A1 | 8/2010 | Kiani |
| 2010/0210539 A1 | 8/2010 | Bevec et al. |
| 2010/0311668 A1 | 12/2010 | Farwick et al. |
| 2011/0033540 A1 | 2/2011 | Daniloff et al. |
| 2011/0129552 A1 | 6/2011 | Saha et al. |
| 2011/0245757 A1 | 10/2011 | Myntti et al. |
| 2011/0262558 A1 | 10/2011 | Huckfeldt et al. |
| 2011/0283662 A1 | 11/2011 | Zhang et al. |
| 2012/0100183 A1 | 4/2012 | Schlessinger et al. |
| 2012/0203211 A1 | 8/2012 | Weadock et al. |
| 2012/0282348 A1 | 11/2012 | Yates et al. |
| 2012/0282351 A1 | 11/2012 | Najafi et al. |
| 2013/0006226 A1 | 1/2013 | Hong et al. |
| 2013/0085093 A1 | 4/2013 | Ishihara et al. |
| 2013/0085469 A1 | 4/2013 | Polaschegg |
| 2013/0123221 A1 | 5/2013 | Pearlman |
| 2014/0179640 A1 | 6/2014 | Weinberger et al. |
| 2015/0343172 A1 | 12/2015 | Woody |
| 2016/0158393 A1 | 6/2016 | Woody |
| 2016/0184220 A1 | 6/2016 | Woody |
| 2017/0128600 A1 | 5/2017 | Woody |
| 2018/0344972 A1 | 12/2018 | Woody |

FOREIGN PATENT DOCUMENTS

| | | |
|---|---|---|
| CA | 2939940 A1 | 8/2015 |
| CA | 2968525 A1 | 5/2016 |
| CA | 2989644 A1 | 12/2016 |
| CN | 106029156 A | 10/2016 |
| EP | 3107612 A1 | 12/2016 |
| EP | 3221012 A2 | 9/2017 |
| EP | 3310443 A1 | 4/2018 |
| GB | 241456 A | 10/1925 |
| GB | 2481456 A | 12/2011 |
| GB | 2511350 A | 9/2014 |
| JP | 2017534689 A | 11/2017 |
| JP | 5335337 B2 | 5/2018 |
| JP | 6335337 B2 | 5/2018 |
| JP | 2018115163 A | 7/2018 |
| JP | 2018521992 A | 8/2018 |
| LU | 92856 A1 | 2/2016 |
| LU | 92856 B1 | 2/2016 |
| MX | 2016010864 A | 5/2017 |
| MX | 2017006657 A | 3/2018 |
| WO | 2013142374 A1 | 9/2013 |
| WO | 2015127330 A1 | 8/2015 |
| WO | 2015127390 A1 | 8/2015 |
| WO | 2016081724 A2 | 5/2016 |
| WO | 2016081724 A3 | 9/2016 |
| WO | 2016205620 A1 | 12/2016 |
| WO | 2016205812 A1 | 12/2016 |

OTHER PUBLICATIONS

APhA Website (https://www.pharmacist.com/frequently-asked-questions-about-pharmaceutical-compounding; accessed online Apr. 3, 2020; available at least by Nov. 29, 2012).

Pittman; MedPage Today; https://www.center4research.org/no-need-skin-preps-sterile-fda-told/; Dec. 13, 2012; accessed online Apr. 3, 2020.

Mosley, G. A., PMF Newsletter (2008), 14(5); pp. 2-6 and 9-14.

Burnett, et al. "Stategies to Prevent Urinary Tract Infection from Urinary Catheter Insertion in the Emergency Department", Journal of Emergency Nursing, vol. 36, Issue 6, p. 548, Dec. 9, 2009.

Federal Register, vol. 80, No. 84, May 1, 2015, pp. 25166-25198.

Cantrell, "Sharing Successes Paves the Road the Road to Higher-Quality Healthcare", Healthcare Purchasing News, Available online at <https://www.hpnonline.com/inside/2014-04/1404-IP-Success.html>, published on Apr. 2014, 8 pages.

Centers for Disease Control and Prevention, "Technical Information—HAI and Antibiotic Use Prevalence Survey", Emerging Infections Program—Healthcare-associated Infections Projects, 2014, 3 pages.

"Enterobacteriaceae (CRE)", Federal Register, vol. 80, No. 84, May 1, 2015, pp. 25169 (Total 30 pages).

Kawasaki City College of Nursing Repository Bulletin, vol. 12, No. 1, 2007, pp. 17-25.

Ali et al., "Skin pH: From Basic Science to Basic Skin Care", Acta Dermato-Venereologica, vol. 93, Jan. 16, 2013, 9 pages.

Burnett et al., "Stategies to Prevent Urinary Tract Infection from Urinary Catheter Insertion in the Emergency Department", Journal of Emergency Nursing, Dec. 9, 2009, 548 Pages.

Cantrell, Susan, "Sharing Successes Paves the Road to Higher-Quality Healthcare", HealthCare Purchasing News, Available online at <https://www.hpnonline.com/inside/2014-04/1404-IP-Success.html>, Apr. 2014, 8 pages.

Del Rosso et al., "The Clinical Relevance of Maintaining the Functional Integrity of the Stratum Corneum in both Healthy and Disease-Affected Skin", Journal of Clinical Aesthetic Dermatology, vol. 4, Issue 9, Sep. 16, 2011, 19 pages.

Department of Health and Human Services, "Safety and Effectiveness of Health Care Antiseptics; Topical Antimicrobial Drug Products for Over-the-Counter Human Use; Proposed Amendment of the Tentative Final Monograph; Reopening of Administrative Record", Federal Register, vol. 80, No. 84, May 1, 2015, pp. 25166-25205.

Gould et al., "Guideline For Prevention of Catheter-associated Urinary Tract Infections", Centers For Disease Control, Healthcare Infection Control Practices Advisory Committee, 2009, p. 8, 9; Q2B.1.a; p. 39 (Total 67 Pages).

Lo et al., "Strategies to Prevent Catheter-Associated Urinary Tract Infections in Acute Care Hospitals", Infection Control and Hospital Epidemiology, vol. 29, Supplement 1, Oct. 2008, p. S41.

Magill et al., "Multistate Point-Prevalence Survey of Health Care-Associated Infections", The New England Journal of Medicine, vol. 370, No. 13, Published on Mar. 27, 2014, pp. 1198-1208.

Marks, R., "The Stratum Corneum Barrier: The Final Frontier", American Society for Nutritional Sciences, 2004, pp. 2017S-2021S.

Mintel GNPD, "Acne Scar Reduction System", Dermajuv, Feb. 1, 2010, pp. 1-9.

Mosley et al., "Sterilization and Estimates", Pharmaceutical Microbiology Forum Newsletter, vol. 14, Issue 5, May 2008, pp. 1-15.

International Search Report and Written Opinion received for PCT Patent Application No. PCT/US2015/61581, mailed on Jul. 18, 2016, 11 pages.

International Preliminary Report on Patentability received for PCT Application No. PCT/US2015/017151, mailed on Sep. 1, 2016, 6 pages.

International Search Report and Written Opinion received for PCT Application No. PCT/US2015/017151, mailed on Aug. 11, 2015, 7 pages.

International Preliminary Report on Patentability received for PCT Application No. PCT/US2015/061581, mailed on Jun. 1, 2017, 9 pages.

International Preliminary Report on Patentability received for PCT Application No. PCT/US2016/038043, completed on Nov. 2, 2017, 22 pages.

International Search Report and Written Opinion received for PCT Application No. PCT/US2016/038043, mailed on Sep. 27, 2016, 12 pages.

(56) References Cited

OTHER PUBLICATIONS

International Preliminary Report on Patentability received for PCT Application No. PCT/US2016/038409, completed on Oct. 31, 2017, 12 pages.
International Search Report and Written Opinion received for PCT Application No. PCT/US2016/038409, mailed on Sep. 21, 2016, 10 pages.
Schauer et al., "Bariatric Surgery Versus Intensive Medical Therapy for Diabetes—3-Year Outcomes", The New England Journal of Medicine, vol. 370, Issue 21, Mar. 31, 2014, pp. 2002-2013.
Tambyah et al., "The Direct Costs of Nosocomial Catheter-Associated Urinary Tract Infection in the Era of Managed Care", Infection Control & Hospital Epidemiology, vol. 23, Issue 1, Jan. 2002, pp. 27-31.
Theraworx, "When Clean Is Not Enough", Retrieved from the Internet:https://www.amemedbeds.com/pdf_files/brochure-theraworx.pdf, Aug. 1, 2014, pp. 7-8.
Vanderbilt University, "VUMC Guidelines for Management of Indwelling Urinary Catheters", Vanderbilt University Medical Center, Jun. 3, 2010, 5 Pages.
Woody, "Method for Maintenance of Urethral Catheters", U.S. Appl. No. 61/943,287, filed Feb. 21, 2014, 25 pages.
Woody, "Method for the Prevention and Treatment of Acne", U.S. Appl. No. 62/082,019, filed Nov. 19, 2014, 27 pages.
Zeuzem et al., "Sofosbuvir and Ribavirin in HGV Genotypes 2 and 3", The New England Journal of Medicine, vol. 370, No. 21, May 22, 2014, pp. 1993-2001.
Lynn P. Roser, Emily C. Piercy, and Terry Altpeter, "Targeting zero: One hospital's journey to reduce :; AUTI", Nursing Management, Dec. 2014, 3 pages.
Japanese Patent Office, Office Action Translation, Dated Aug. 1, 2017,2 pages.
Firsthealth, FirstHealth Moore Regional Hospital, Pinehurst, NC; Aug. 2013-Oct. 2013; https://www.hpnonline.com/inside/2014-0411404-IP-Success.html, 2 pages.
Witoxicity, Sebamed: Liquid Face+ Body Wash For Sensitive Skin Review, Apr. 2012, https://www.witoxicity.com/2012/04/ sebamed-liquid-face-body-wash-for.html (Year: 2012).
Subramanyan, K., et al., Personal Cleansing, 2007, Handbook for Cleaning/Decontamination of Surfaces, pp. 257-276 (Year: 2007).
Healthboards, Is it too much to wash your face 3 x per day?, Jan. 2005, https://www.healthboards.com/boards/acne/245343-too-much-wash-your-face-3-x-per-day.html (Year: 2005).
Merriam-Webster, Definition of "antiseptic", https://www.merriam-webster.com/dictionary/antiseptic (Year: 2021).
Mullany et al, Safety and Impact of Chlorhexidine Antisepsis Interventions for Improving Neonatal Health in Developing Countries, Aug. 2006, The Pediatric Infectious Disease Journal, vol. 25 No. 8, pp. 665-675 (Year: 2006).
Coia et al., Guidelines for the control and prevention of meticillin-resistant *Staphylococcus aureus* (MRSA) in healthcare facilities, Apr. 2006, Journal of Hospital Infection, 63S, pp. S1-S44 (Year: 2006).
Braden, B., et al., "Clinical Practice Guidelines Archive", Agency for Healthcare Research and Quality, pp. 1-20 (1988).
Paulson, D.S, et al., "Efficacy and Safety of a Novel Skin Cleansing Formulation Versus Chlorhexidine Gluconate", American Journal of infection Controi, pp. 1-4 (2018).
Wiemken, T.L, et al., "Efficacy of a Novei Skin Antiseptic Against Carbapenem-Resistant Enterobacteriaceae", American Journal of Infection Control xxx, pp. 1-3 (2015).
Elias, P.M., "The Skin Barrier as an Inmate Immune Element", Semin Irnmunopathol, DOI: 10.1007/s00281-007-0060-9, vol. 20, pp. 3-14, Mar. 30, 2007.
McDonald, Best Practices for Hand Hygiene, Jul. 2012, British Columbia Ministry of Health, 1-71 (Year: 2012).
Health Research & Educational Trust. Hand Hygiene Project: Best Practices from Hospitals Participating in the Joint Commission Center for Transforming Healthcare Project. Chicago: Health Research & Educational Trust, 2010. (Year: 2010).
Office Action received for European Patent Application No. 15714693.7, mailed on May 3, 2018, 3 pages.
Office Action received for European Patent Application No. 15714693.7, mailed on Aug. 30, 2017, 3 pages.
Office Action received for European Patent Application No. 15714693.7, mailed on Dec. 17, 2018, 3 pages.
Office Action received for European Patent Application No. 15856176.1, mailed on Feb. 6, 2019, 7 pages.
Office Action received for European Patent Application No. 16741722.9, mailed on Feb. 5, 2019, 7 pages.
Office Action received for Australian Patent Application No. 2015218703, mailed on Jan. 9, 2019, 4 pages.
Office Action received for Chinese Patent Application No. 201580009856, mailed on Sep. 5, 2018, 8 pages.
Decision to Grant received for Japanese Patent Application No. 2016-570926, mailed on Apr. 13, 2018, 2 pages.
Notification of Reasons for Refusal received for Japanese Patent Application No. 2018-016713, mailed on Dec. 26, 2018, 3 pages.
Burnett et al., "Strategies to prevent urinary tract infection from urinary catheter insertion in the emergency department", Journal of Emergency Nursing, vol. 36, Issue 6, Nov. 2010, pp. 546-550.
Examination Report in AU Application No. 2015218703, dated Jan. 7, 2020.
US Office Action dated Nov. 3, 2023 issued in related U.S. Appl. No. 15/187,484.
European Extended Search Report dated Oct. 26, 2023 issued in related European Application No. 20821812.3.
Sharpe, J. R., etal. J. Burn Care Res. (2013), 34(3); e201-e208.
Oliveira, G., et al. (Int. J. Pharm. (Jan. 2014); 464; 145-151 (Year: 2014).
Lotion Warmer website (https://www.shebanails.com/contents/en-us/p850.html; accessed online Apr. 14, 2024, available at least by Feb. 22, 2012) (Year: 2012).
Deep Heating Pain Relief Cream; Blue Goo; Mintel; Nov. 2010.
Capsaicin Arthritis Cream; Church & Dwight; Rub A535; Mintel; Oct. 2008.

\* cited by examiner

COMPOSITIONS AND METHODS FOR THE ANTISEPTIC TREATMENT OF BIOFILMS ON MAMMALIAN TISSUE

FIELD OF THE INVENTION

This invention relates to compositions and methods for the antiseptic cleansing and antimicrobial treatment of infections in mammalian tissue. More specifically, the invention is directed to compositions and methods for reducing hospital acquired infections, treating patients suffering from chronic skin infections, particularly skin infections associated with wounds and burns, and for antiseptic cleansing and antimicrobial treatment of infections.

BACKGROUND OF THE INVENTION

Inflammation is a key element of the innate immune system in the response to a variety of challenges, including those caused by bacterial and viral infection s as well as by damaged or dying host cells. It is well understood that resolution of inflammation is essential for maintaining the balance between health and disease. Excessive uncontrolled inflammation results in a variety of pathological conditions and evolution of the inflammatory responses is thus a result of a trade-off between its beneficial and detrimental effects. Virus infections, for example, occur following entrance of virions into host cells by a variety of mechanisms including endocytosis of non-enveloped viruses and fusion with the cell membrane by enveloped viruses. One primary barrier to the infection is epithelial keratinocyte of the skin. Alterations in skin barrier function are seen in atopic dermatitis, and are believed to contribute to infection with bacteria and selected viruses, including Herpesviridae (herpes simplex virus), varicella-zoster virus and vaccinia virus. However, it is unlikely that a defect in the physical barrier alone accounts for the remarkably increased susceptibility to recurrent skin infections. Patients with plaque psoriasis, a common mediated inflammatory skin disease also associated with skin barrier dysfunction, do not have increased susceptibility to microbial skin infection. Additionally, inflammation is associated with viral infection, bacterial infection, bacterial biofilms, viral biofilms, fungal infections, fungal biofilms, yeast infections, yeast biofilms, contact with other inflammatory agents and/or autoimmune diseases or disorders. To limit inflammation several negative regulators of TLR, signaling are involved via sequestration of signaling molecules, blockade of their recruitment, degradation of target proteins or inhibition of transcription. To control inflammation, commensal bacteria have modulated epithelial pro-inflammatory responses that release proteinases to cleave and inactivate cytokines IL-1 and IL-6 or interference with signaling by inhibition of IκB ubiquitination in gut.

Microorganisms tend to exhibit two distinct modes of behavior. The first mode of behavior is a free floating, or planktonic, form in which single cells float or swim independently in a liquid medium. The second mode of behavior is an attached state in which the cells colonize, become closely packed on a solid surface, and firmly attach to each other and the solid surface, sometimes referred to as a biofilm. Biofilms, also called biological films, refer in general to the structures, or protective coats, formed when heterogeneous mixtures of yeast, proteins, polysaccharide, hyphae, and DNA become embedded by microorganisms in complex extracellular polymeric materials, such as polysaccharides and proteins. Biofilms occur when a group of microorganisms or pathogens of the same or different species aggregate on a surface and reach a pre-determined density and begin to secrete protective extracellular polymeric substances to create an adhesive matrix of polymeric material. Biofilms are also an intracellular association of microorganisms that proliferate within the biofilm when and while it is attached to the surface.

The change in cellular behavior that leads to biofilm formation is triggered in part by quorum sensing. When the cell switches modes from planktonic to film forming, it undergoes a phenotypic shift in behavior in which large suites of genes are up- and down-regulated. For example, bacteria living in a biofilm usually have significantly different properties from planktonic bacteria as the dense and protected environment of the biofilm allows them to cooperate and interact in various ways. When in an environment supporting sufficient resources for growth, biofilms will quickly grow to be macroscopic. Once formed, the biofilms attach to each other on the solid surfaces and on the surfaces of mammalian tissue to provide a protective environment for the microorganisms. There is an organismic cooperative response of the multi-cellular aggregates, which allows the individual pathogen or colonial subgroups of microorganisms to exhibit additional coordinated behaviors and to confer advantages.

The control of gene expression in response to quorum sensing has become recognized as the general mechanism for gene regulation in many a bacterium, especially gram-negative bacteria. Quorum sensing bacteria synthesize, release, and respond to specific N-acyl-homoserine lactone (i.e. "AHL" or "HSL") signaling molecules called autoinducers to regulate and coordinate cell behavior and interactions, such as controlling gene expression as a function of cell density. It is now known that gram-negative bacteria employ one or more quorum sensing systems comprising HSL to regulate in a cell density-dependent manner biofilm formation.

As mentioned above, contact of the microorganism with a solid surface triggers the expression of a panel of bacterial enzymes, which catalyze the formation of sticky polysaccharides that promote colonization and protection. Biofilms form on a wide variety of solid surfaces, including living tissue. The solid-liquid interface between a surface and an aqueous medium provides an ideal environment for the attachment and growth of microorganisms. Microorganisms colonize and attach more rapidly to hydrophobic, non-polar, rough surfaces. Other characteristics such as pH, nutrient level, ionic strength and temperature play a role in biofilm surface attachment. The early step in bacterial biofilm formation involves adherence of the bacteria to the surface and a dramatic increase in cell density. There are at least two distinct cell-cell quorum sensing communication systems, collectively referred to as QS systems. Each QS system shares a general mechanism where the cell secretes an autoinducing molecule. When the population density of the cell and the concentration of the autoinducer reach a critical threshold, the cell can sufficiently bind to and hence sense the autoinducer. The effect of binding is a cascade of changes in gene regulation.

Of the two known QS systems, the one that activates competence, which is the ability to take up new genetic material, is best understood. According to the current understanding of this system, once the quorum threshold is achieved, then genes involved in uptake and processing of extracellular DNA (i.e. transformation) become activated. The system critically relies in part on a pair of proteins that make up a two-component signal transduction system which relies on a transmembrane sensor and an intracellular response regulator. The pathway is initiated by the expression of the comC gene which encodes a 46 amino acid polypeptide of which the first 25 amino acids represent a signal/secretion domain. This domain is believed to be cleaved off by the ComA/B antiporter that secretes the mature 21 amino acid peptide, henceforth called CSP, for "competence stimulating peptide." It is believed that when the density of cells and the concentration of CSP reaches a critical threshold, there is sufficient interaction of the CSP with the two-component transmembrane sensor, ComD. Upon binding of CSP to ComD, the intercellular domain becomes phosphorylated. Consequently, this phosphate group is specifically donated to the ComE response regulator protein. Phosphorylated ComE appears to be able to activate certain promoters by building to a consensus site $-70$ to $-50$ bp upstream of the target genes transcription start. The aforementioned Com genes seem to be upregulated, including an additional gene, ComX, which encodes an alternative sigma factor called ComX. ComX is purported to activate the structural genes that are required for the microorganism or bacteria to uptake and incorporate DNA. Microorganisms, such as *Streptococcus*, colonize on a smooth surface, where the ability to colonize is strongly enhanced in the presence of sucrose by a group of glycosyltransferases enzymes. Among these enzymes is a group of three homologous glucosyltranferases ("GTF") which are also necessary for efficient colonization. All three GTEs transfer a glucose moiety from sucrose to a growth polysaccharide chain of glucose subunits (glucans). In addition, all three GTFs share at least 50% amino acid sequence identity, with GTFB and GTFC being greater than 75% identical.

All three GTFs function extracellularly in acquiring the necessary sucrose. In addition, each GTF can be distinguished by the clycoside linkage of its glucan product. GTFB forms primarily alpha-1-3 glucosidic linkages (mutan) that are insoluble while GTFD creates primarily alpha-1-6 glucosidic linkages (dextran) that are soluble. Dextran is believed to be an important component of the biofilm structure and can readily be metabolized by extracellular dextranases. Mutan is believed to be essential for adherence and is very persistent, being a very poor metabolic substrate. The formation of mutan is considered essential for both a critical and committed step where sucrose, a preferred carbon source, is irreversibly used for attachment. Once attachment has occurred, specific adhesins are utilized for more permanent anchoring of the bacteria to the solid surface. Therefore, there is a critical need for mutan in the production and formation of a biofilm.

QS molecules that are synthesized, released, detected by microorganisms for use in cell-cell communication that help trigger and coordinate part of the biofilm forming process. As for the cell-cell communication system, it is now known that bacteria constantly secrete low levels of the quorum sensing signals and sense them either through receptors on their surfaces, or internally. The receptors trigger behavioral changes when there are enough bacteria to allow the signals' concentrations to achieve a critical threshold. Once this occurs, bacteria respond by adopting communal behavior, form a biofilm, and in some cases deploy virulence factors such as toxins. In addition to cellular communicating with members of their own bacteria species, bacteria also conduct interspecies communications. A biofilm may involve or contain more than one species of bacteria or a different pathogen altogether, such as a virus.

Antimicrobials are presently used to kill bacteria associated with biofilms and to control its development and growth. However, once biofilms are established, antimicrobials have little to no impact on the removal of live or dead biofilms, as antimicrobials have a difficult time penetrating the biofilm's surface layer. Antimicrobials are far less effective in killing bacteria once the biofilm protecting the pathogen has formed and been established. The treatment of biofilms requires interfering with or disrupting the quorum sensing signals of the microorganism colony with biofilm disrupter molecules. Since biofilm formation requires a signaling system, inhibition of the quorum sensing system would result in an impaired ability to form biofilms and therefore in an increased susceptibility to antibacterial treatment.

The major benefit of the protective environment generated by the biofilm is the increased resistance of the microorganism to detergents, cleansing solutions and antibiotics afforded by the extracellular matrix and the outer layer of the cells which protect the interior of the microorganism community within the biofilm, including increased resistance to the host's natural immune defenses. Biofilm structures thrive as they enable respiration and fluid and nutrient exchange while preventing attack by host immune cells such as phagocytes and antimicrobials. Pathogens embedded within biofilm are resistant to both the immunological and non-specific defense mechanisms of the body. The clinical treatment of biofilm infections often proves to be problematic since they are difficult to treat and show reduced sensitivity or resistance to antibiotics. Left untreated, infections caused by the pathogen, and the biofilms protecting it, often result in disease such as bacteremia, pneumonia, meningitis, osteomyelitis, endocarditis, arthritis, urinary tract infections, tetanus, gangrene, colitis, acne, fasciitis, chronic wounds, abscesses and nosocomial infections.

When biofilms form on mammalian tissue, there are often accompanied by an infection caused by the microorganisms contained within, and protected by, the biofilms. In the medical field, there have been many reports in recent years of hospital acquired infections ("HAT's"), which are infections acquired in the hospital as the result of a hospital stay, also called "nosocomial infections," caused by biofilms formed by microorganisms that survive on the surface of, for example, a patient's chronic wound, a burn, heart valves, and the narrow interstices and surfaces of implant devices, medical equipment and prosthetics. Microorganisms generally live attached to these surfaces. The contact of the microorganism with a solid surface triggers the expression of a panel of bacterial enzymes, which catalyze the formation of sticky polysaccharides that promote colonization and protection. The structure of biofilms is such that immune responses may be directed only at those antigens found on the outer surface of the biofilm and antibodies or other proteins often fail to penetrate the biofilm. In addition, phagocytes are unable to effectively engulf a bacterium growing with the biofilm's complex polysaccharide matrix that is attached to a solid surface. This causes phagocytes to release large amounts of pro-inflammatory enzymes and cytokines that lead to inflammation and the destruction of any nearby healthy tissue.

The microorganisms or pathogens that form these biofilms include bacteria, viruses, fungus, mold, parasites, algae, and yeast. So far, no sufficient inhibiting effects are exhibited by antimicrobials, such as bactericides. In addition, no sufficient inhibiting effects have been exhibited by antibiotics, such tobramycin, as biofilms have shown remarkable and ever-increasing resistance to antibiotics and antimicrobials. In most natural settings, bacteria, viruses, and fungus grow predominantly in biofilms. In medical settings, the most prominent and ubiquitous pathogens are the various strains of bacteria, such as *Pseudomonas aeruginosa* (*P. aeruginosa*), *Bacillus cerius*, and *Staphylococcus aureus* (*S. aureus* or MRSA), which are all capable of creating biofilms to provide a safe harbor of protection for the growth and proliferation of the bacteria thriving within the biofilm.

The pathogens contained and protected in the biofilms are the cause for the pathogenesis of many infections. Normally, a human host defense system is adequate to prevent infection. However, in compromised individuals, such as those having cystic fibrosis, serious burns, or chronic wounds, the body's immune and pathogen defense system is unable to destroy the pathogens that form part of the biofilm. The leading cause of death in such cases is infection. Various infections are acquired in a hospitals and clinics, as well as in rehabilitation and long-term care facilities. These infections occur where patients contact other patients, hospital care facility or clinic staff, or the facilities, devices, and equipment. Nosocomial infections are especially common in patients in intensive care units as these patients often have weakened immune systems and are frequently on ventilators or have catheters implanted. For example, one study found that nearly half the patients with implanted orthopedic devices and admitted to a hospital with MRSA, had developed an implant-associated infection. Urinary tract infections ("UTI's"), which include infection of the bladder system and kidney, are among the most common form of bacterial infections. Nearly, 13 million women per year suffer from UTI's in the United States alone, and more than half of all women will experience a UTI during their lifetime.

Chronic wounds include, but are not limited to, diabetic ulcers and venous and other ulcers and are characterized by poor blood circulation and oxygenation of tissues, among other things. Chronic wounds are also prone to characterization by biofilm formation and are thus particularly difficult to eradicate and heal given the decreased or inadequate blood flow existing in and around the wound. Biofilms can characterize any chronic wound. As an example, an implantable device, such as a catheter of the type that may be inserted in an emergency room or in an extended care facility may remain inserted for an extended time so that a biofilm develops. These films provide protection to the invading pathogens formed on the surface of the device, such as bacteria, and prevent the host from eradicating the bacteria.

These types of surface wounds typically, in state-of-the-art treatments, are debrided with sharp surgical instruments to remove necrotic or devitalized tissue and layers of biofilm and to expose fresh surfaces to antiseptic cleansing and antibiotic treatment.

Burns represent an area where a patient's integumentary system has been disrupted and exposed. The damage to the skin tissue can produce a viable site for infections characterized and caused by biofilm formations.

Biofilms can also effectively form on the healthy skin surfaces around a chronic wound or burn, particularly when a patient is indwelling over an extended period in a nursing home or other type of extended care facility. These biofilms can be particularly difficult to eradicate and can lead to further the chronic infection in such patients.

Various attempts to destroy or disrupt biofilm formation can be found in the prior art. Yet, over the years, none have kept pace with the evolving organismic response of a more virulent and increasingly broad spectrum of resistant microorganisms that include biofilms as one tool in their war chest against their eradication. Among the various attempts to control or eradicate biofilms are physical based methods, chemical based methods, gene-based methods, pharmaceutical based methods, and plant-based methods.

Physical based methods for reducing biofilm formation have included using ultrasonic waves or electromagnetics, as described in U.S. Pat. No. 10,092,308.

Chemical based methods for treating biofilms have been directed to compositions containing a curcumin derivative, as described in U.S. Pat. No. 9,271,493; an anionic surfactants, as described in U.S. Pat. Nos. 8,829,055 and 10,238,108, long chain alcohols or aldehydes, as described in U.S. Pat. Nos. 9,591,852 and 9,848,600; nitric oxide containing compositions, as described in U.S. Pat. No. 8,425,945; catechols, such as xanthochymol or garcinol, as described in U.S. Pat. No. 9,648,876; and small molecules, also known as quorum sensing inhibitors, as described in U.S. Pat. Nos. 9,988,380, 9,415,040 and 9,227,996.

Gene-based methods directed to treating a condition associated with *Streptococcus mutans* bacterium with quorum sensing molecules to inhibit the expression of the enzyme, glucosyltransferase, necessary for efficient colonization of the bacterium, thereby changing the growth rate of the bacterium in the biofilm, are described in U.S. Pat. No. 9,127,045; along with biofilm formation reducing agents of D-leucine, D-Serine or 3-idolyacetonitrile, as described in U.S. Pat. No. 10,111,431; the use of a modulating expression of a cysB gene in a cell, as described in U.S. Pat. No. 7,604,978; while disrupting and preventing biofilms by regulating the biofilm's self-production of deoxyribonucleases to degrade the DNA within the biofilm and thereby manipulate the properties of the biofilm, are described in U.S. Pat. No. 9,675,736.

Pharmaceutical based methods for inhibiting biofilm formation or reducing established biofilms include using pegylated aminoglycoside compounds, such as a pegylated tobramycin (i.e. where polyethylene glycol is covalently bonded to the tobramycin antibacterial), as described in U.S. Pat. No. 10,272,158.

Plant extract-based methods for inhibiting biofilm formation include using a polyphenolic composition isolated from an alcohol extract of a plant, as described in U.S. Pat. No. 9,351,492; or using anthraquinone or naphtoquinone combined with an apolar plant extract of *Rheum palmatum*, as described in U.S. Pat. No. 7,691,418; or the use of a potherb mustard plant extract, as described in U.S. Pat. No. 10,201,493.

To date, the only treatment known to be somewhat effective against biofilms is antibiotics. The way antibiotics generally work is to take advantage of the variant metabolic pathways that exist between humans and bacteria, thereby, differentially affecting bacterial cells. However, antibiotics have two distinct drawbacks. First, they are not specific to any one type of bacteria pathogen and can damage commensal or beneficial bacteria resulting in new pathologies. Second, many bacteria have already evolved to become resistant to antibiotics. In addition, antibiotics are not very effective against bacterial infections once the biofilms have formed in conjunction with the infection and have established themselves.

Therefore, there is an urgent need to develop treatment compositions or formulas based on chemical, plant extract, or genetic-based treatment compositions that could be used in methods to limit or treat the inflammation caused by microbials and biofilms associated with chronic infections such as biofilm associated skin infections. While such compositions would not necessarily function as antibiotics, antifungal, or antiviral agents themselves, they could be used as a prophylactic to limit biofilm formation, so that the individual microorganisms or pathogens would no longer benefit from the protection of organismic colonialization that occurs in a biofilm and would thereby be vulnerable to attack by conventional treatment methods, including the immunological defenses of the host. It is desirable that the formulation, at the same time, also serve as an antiseptic cleanser of the stratum corneum of the tissue and other tissue surfaces, and help the tissue maintain and improve by engaging its own natural barrier and immunological defense properties.

It would be desirable to develop new chemical, plant extract and genetic based compositions and methods for treating nosocomial microbial, and biofilm associated, skin infections and improve the arsenal of antimicrobial treatments without increasing the adverse side effects as can be experienced with harsh base or acid skin cleansers currently used to treat nosocomial infections in the treatment of, for example, chronic wounds and burns.

It would also be desirable to develop new chemical, plant extract and genetic based compositions and methods for treating biofilm associated skin infections and improve the arsenal of antimicrobial treatments without increasing the adverse side effects as can be experienced with harsh base or acid skin cleansers currently used for chronic wounds and burns.

It would also be desirable to develop new chemical, plant extract and genetic based compositions that retain efficacy at low concentration of antimicrobial agents and yet have the capability of treating biofilms, especially bacterial biofilms, on the surface of mammalian tissue, such as those associated with temporary implantable devices, burns and chronic wounds without increasing the adverse side effects as can be experienced with harsh base or acid skin cleansers.

SUMMARY OF THE INVENTION

The invention relates to compositions and methods for providing the hybrid benefit of treating the inflammation associated with infections of mammalian tissue associated with microbials while simultaneously providing antiseptic cleansing and maintenance of tissue surfaces, including the stratum corneum, and an opportunity for the tissue to improve by engaging its own natural barrier and immunological defense properties, by contacting the surface of the tissue with one or more compositions providing these requirements of the invention.

In another aspect, the invention is directed to compositions and methods for providing the hybrid benefit of modulating quorum sensing in a microorganism leading to biofilm formation on the surface of mammalian tissue and providing for the antiseptic cleansing and maintenance of the tissues including the stratum corneum, and an opportunity for the tissue to improve by engaging its own natural barrier and immunological defense properties, by contacting the surface of the tissue with one or more compositions providing these benefits of the invention. More specifically, the compositions of the invention inhibit the quorum sensing system employed by colonized microorganisms to express virulence genes and other phenotypes including swarming, motility and biofilm formation, thereby significantly reducing or completely abolishing the pathogen population, rendering the pathogen population susceptible to the host's immune response, and treatment with traditional antibacterial agents.

In another aspect, the invention is directed to a method for providing the hybrid benefit of modulating quorum sensing in a microorganism leading to biofilm formation on the surface of mammalian tissue while simultaneously providing for the antiseptic cleansing and maintenance of the tissue, including the stratum corneum, and an opportunity for the tissue to improve by engaging its own natural barrier and immunological defense properties, by contacting the surface of the tissue with compositions containing either a chemical, genetic, or plant extract material The invention relates to a method for providing the hybrid benefit of treating biofilms on the surface of mammalian tissue, especially biofilms that occur in association with chronic wounds and burns, while simultaneously providing an antiseptic cleansing and maintenance of the stratum corneum of the tissue and other tissue surfaces, and an opportunity for the tissue to improve by engaging its own natural barrier and immunological defense properties, by contacting the surface of the tissue with one or more compositions of the present invention.

In one embodiment, the invention relates to a method for providing the hybrid benefit of preventing biofilm formation on the surface of mammalian tissue, especially biofilms that occur in association with chronic wounds and burns, while simultaneously providing for an antiseptic cleansing and maintenance of the stratum corneum of the tissue and other tissue surfaces, and an opportunity for the tissue to improve by engaging its own natural barrier and immunological defense properties, by contacting the surface of the tissue with one or more compositions of the present invention.

In another embodiment, the invention is directed to a method for providing the hybrid benefit of disrupting biofilms, having formed on the surface of mammalian tissue, especially biofilms that occur in association with chronic wounds and burns, while simultaneously providing for the antiseptic cleansing and maintenance of the stratum corneum of the tissue and other tissue surfaces, and an opportunity for the tissue to improve by engaging its own natural barrier and immunological defense properties, by contacting the surface of the tissue with one or more compositions of the present invention.

In another embodiment, the invention relates to a method for providing the hybrid benefit of attacking or emulsifying established biofilms, rendering the pathogen population of the biofilm susceptible to the host immune response, and treatment with traditional antibacterial agents, e.g. antibiotics, and providing for the antiseptic cleansing and maintenance of the stratum corneum of mammalian tissue and other tissue surfaces, and an opportunity for the tissue to improve by engaging its own natural barrier and immunological defense properties, by contacting the surface of the tissue with one or more compositions of the present invention.

Another aspect of the invention relates to a method for providing the hybrid benefit of treating biofilm infections that occur on the surface of mammalian tissue, especially biofilms that occur in association with chronic wounds and burns, while simultaneously providing for the antiseptic cleansing and maintenance of the stratum corneum of the tissue and other tissue surfaces, and an opportunity for the tissue to improve by engaging its own natural barrier and immunological defense properties, by contacting the surface of the tissue with one or more compositions of the present invention.

Yet another aspect, the invention relates a method of coating at least a portion of the surface of a medical device with the compositions of the invention, to provide the hybrid benefit of treating biofilms that may occur on the surface of medical device, while simultaneously providing for the antiseptic cleansing and maintenance of such surface, where the medical device may, for example, be a glove, catheter, stent, staple, pin, screw, rod, collar, tube, surgical drain, or an implanted electrical device [see Health Outcomes to expand list], by contacting the surface with one or more compositions of the present invention.

According to an embodiment of the invention, the population of infection causing pathogens of, and in, a biofilm is greatly reduced by the biofilm remediation method of the present invention that offers patients the hybrid benefit of treating biofilms associated with disease, while simultaneously providing for the antiseptic cleansing and maintenance of the tissue, and an opportunity for the tissue to improve by engaging the patient's own natural barrier properties, and providing greater than 90% reduction (1-log order reduction) in the microorganism population; more preferably, the method provides greater than 99% reduction (2-log order reduction) in the microorganism population; and most preferably, the method provides a greater than 99.9% reduction (3-log order reduction) in the population of the microorganism.

In another embodiment, the present invention also relates to a method for treating chronic biofilm associated disease offering the patient the hybrid benefit of treating biofilms associated with disease, while simultaneously providing for the antiseptic cleansing and maintenance of the tissue, and an opportunity for the tissue to improve by engaging the patient's own natural barrier and immunological defense properties, by contacting the surface with one or more compositions of the present invention.

In another aspect, the invention relates to compositions that demonstrate a hybrid benefit of treating the inflammation associated with infections of mammalian tissue, while simultaneously providing antiseptic cleansing and maintenance of the stratum corneum of the tissue and other tissue surfaces, and an opportunity for the tissue to improve by engaging its own natural barrier and immunological defense properties.

In yet another aspect, the invention relates to compositions that demonstrate a hybrid benefit of treating biofilms associated with mammalian tissue, while simultaneously providing for the antiseptic cleansing and maintenance of the stratum corneum of the tissue and other tissue surfaces, and an opportunity for the tissue to improve by engaging its own natural barrier and immunological defense properties.

BRIEF DESCRIPTION OF THE DRAWINGS

The foregoing and other advantages and features of the invention and the manner in which the same may be accomplished will be more readily apparent upon consideration of the following detailed description when taken in conjunction with the accompanying drawings, which illustrate preferred and exemplary embodiments, in which:

FIG. 3 graphically illustrates data showing average reduction in wound area in square centimeters, SQ. CM;

FIG. 4 graphically illustrates data showing the average measurement for reduction in matrix metalloproteinase (hMMP9) activity, which is measured in radio fluorescence units per minute or RFU/min.

FIG. 5 graphically illustrates data showing reduction in the average measurement for the amount of matrix metalloproteinase (MMP) in a patient's wound site;

FIG. 6 graphically illustrates data showing the reduction in the amount of biofilm formation in the wound area, measured in colony forming units per milliliter or CFU/ML; and FIG. 7 graphically illustrates data showing the reduction in the mean area dimensions of a patient's wound at the wound site, or degree of wound closure, measured in square centimeters or SQ, CM.

DETAILED DESCRIPTION OF THE INVENTION

The invention will now be described more fully hereinafter with reference to the drawings of FIGS. 1 through 7 in which are illustrated some, but not all, of the concepts of the invention. Indeed, the invention may be embodied in many different forms and should not be construed as limited to the specific embodiments set forth herein; rather, the embodiments provided in this disclosure are intended to satisfy applicable legal requirements. Although the method and compositions of the invention may be applied to a wide range of pathogens, in order to facilitate a full and complete understanding of the invention, the following exemplary discussions relate to the compositions and method for the antiseptic treatment of a patient's skin along with the inhibition, disruption and eradication of biofilms that form in connection with skin infections, where the compositions are antiseptic and contain ingredients which allow them to treat biofilms through intracellular quorum sensing.

Figure 1:
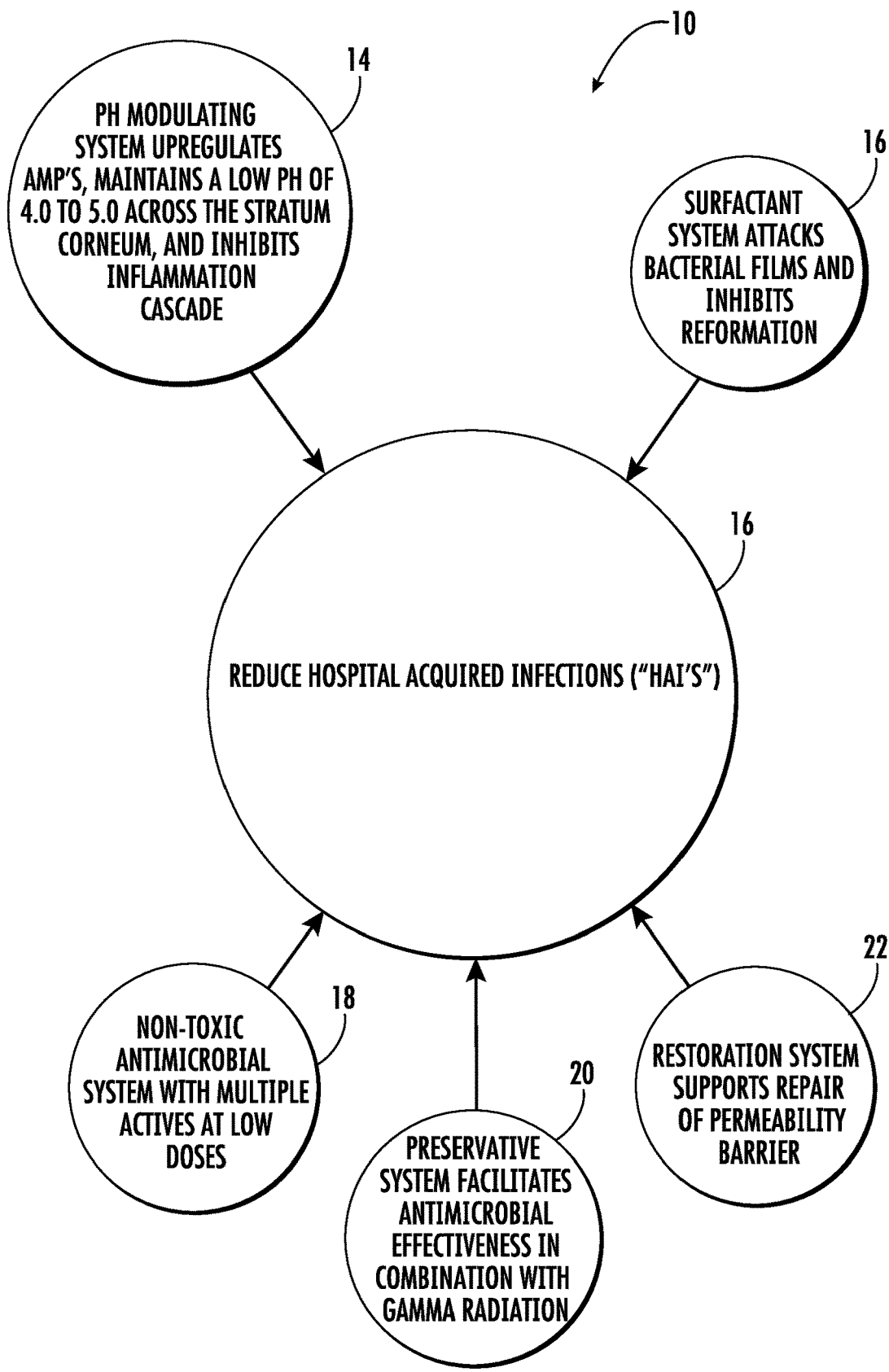
FIG. 1 illustrates generally at 10 in a global spoke and hub diagram the principal relationships of the systems comprising the compositions working within the scope of the invention to reduce hospital acquired infections.

FIG. 1 illustrates at 10 in a global spoke and hub diagram the five (5) principal interdependent systems 14, 16, 18, 20, and 22 comprising the various compositions working within the scope of the invention to reduce hospital acquired infections 12, which are also known by the shorthand "HAI's." System 14 is a pH modulating system of pH about 4.0 to 5.0 that acidifies the tissues and in the case of the skin, as is described further hereinbelow, acidifies the stratum corneum throughout its thickness, whereas the normal condition of the stratum corneum is to proceed from an acidic outer most layer to a basic pH at the inner layer over a very small distance. The pH modulating system of the invention has been determined and is now recognized to upregulate beneficial antimicrobial peptides and to inhibit the inflammation cascade that often accompanies infection or injury to tissue. System 16 is a surfactant system that can breakdown polysaccharides forming bacterial films and inhibit the ability of bacteria to reform these films. System 18 is the antimicrobial system of the composition that includes multiple actives in small quantities to remain effective while avoiding toxicity. System 20 is a preservative system having antimicrobial properties that, when used in connection with gamma radiation, facilitates the effectiveness of the antimicrobial system 18. System 22 is a restoration system for supporting the skin and other tissues own ability to repair its permeability barrier.

Figure 2:
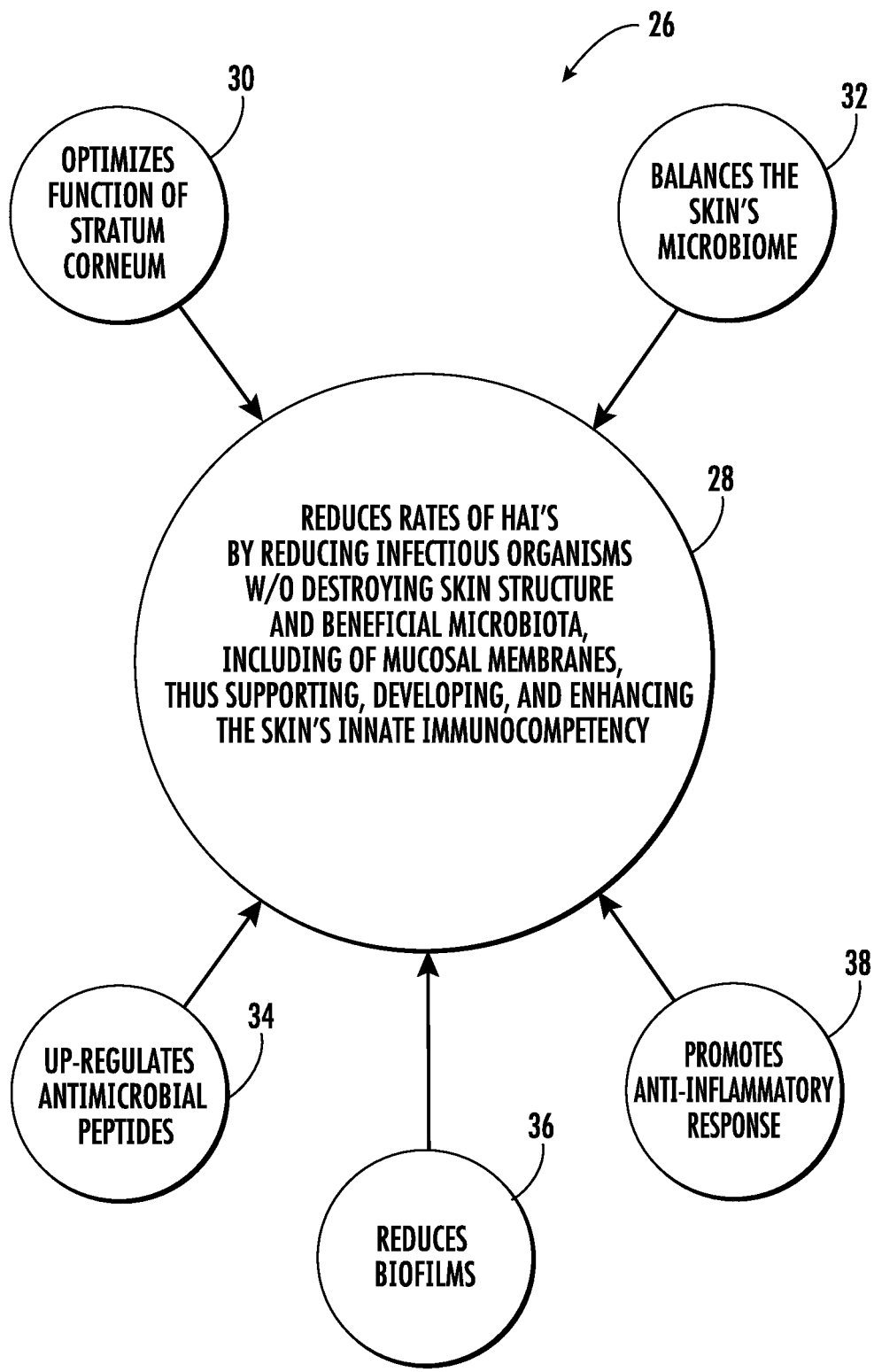
FIG. 2 illustrates generally at 26 in a global spoke and hub diagram the principal functions of the systems comprising the compositions working withing the scope of the invention and their impact on the skin in reducing hospital acquired infections.
Figure 3:
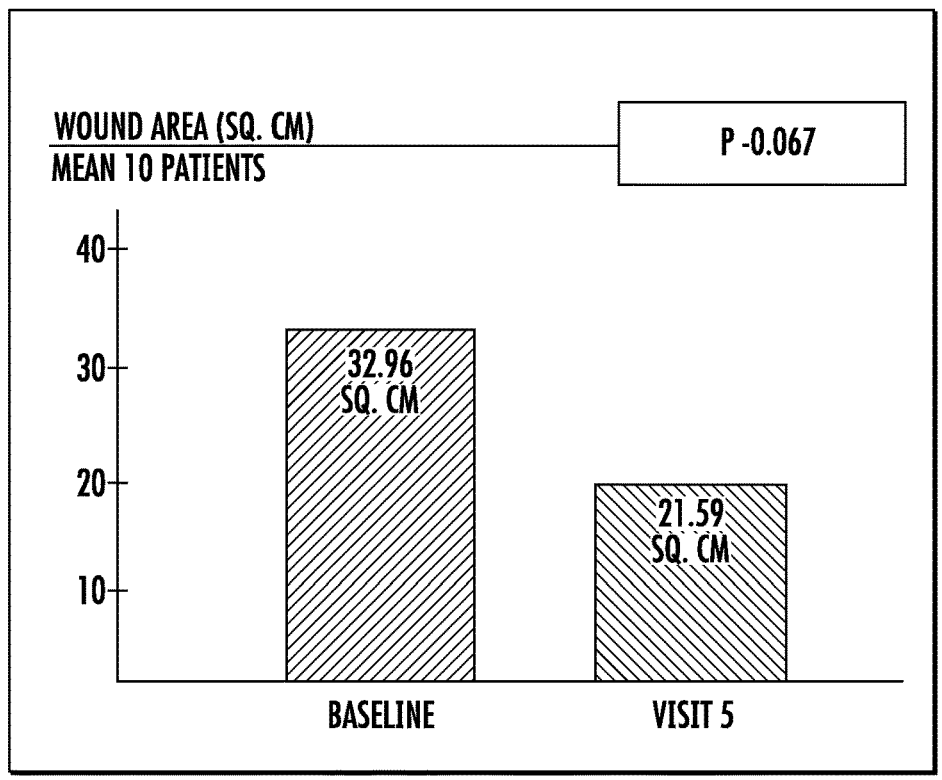
FIGS. 3 through 7 graphically illustrate data from a four (4) week treatment protocol using a composition in accordance with the invention of ten (10) patients in a hospital setting with chronic non-healing lower extremity wounds typically associated with biofilm bacterial colonization in which measurements were taken and averaged among all patients at the beginning of the study and again after four weeks of treatment.

FIG. 2 illustrates at 26 in a global spoke and hub diagram the five(S) principal functions achieved by the above systems acting in concert, and not necessarily independently, and their impact on the skin and tissues to reduce HAI's. As illustrated at 28 one of the greatest functional benefits of the invention is the reduction of HAI's by reducing infectious organisms without destroying skin structure and beneficial microbiota. The compositions can also be used on mucous membranes and thus can be applied to sensitive areas of the body, including the the T-zone of the face, which is that area around the eyes, nose, cheeks, and chin, the nasal passages, ear canals, lips, and the delicate perineum. The systems of the invention illustrated in FIG. 1 are thus able to support and enhance the skin's ability to repair itself and to exhibit its own immunocompetency. The systems work together in the composition to optimize the function of the stratum corneum, step 30, and to balance the skin's microbiome, step 32. Many compositions that are antimicrobial kill not only pathogens, but beneficial bacterial as well, which may be responsible for the rise in hospital acquired infections. The compositions of the invention are believed to enable and promote growth of a healthy microbiome. Step 34 shows that the compositions tend to upregulate naturally occurring antimicrobial peptides. Biofilms are also reduced, step 36. The compositions also promote an anti-inflammatory response, step 38.

Compositions for use in connection with the invention are represented by antiseptic mammalian tissue cleansing, maintenance, antimicrobial, and biofilm treatment chemical, plant extract and genetic based compositions that contain the following key functional ingredients. Each ingredient has been assigned a functional category designation that substantially aligns with the categories assigned to the ingredients outlined and discussed in Harod U.S. Pat. No. 6,358, 516 at Columns 7 to 10 ("Harod"). The Harod patent is directed to some of the antiseptic skin cleansing and maintenance aspects of the chemical, plant extract and genetic based compositions of the invention and its discussion provides a convenient base from which to address the formulations used in connection with the practice of the invention, in particular, with reference to categories of ingredients (a) through (k) discussed below, and some of the ingredients used in these categories may overlap. Functional categories following (k) generally are not disclosed in the Harod patent.

Category (a): a skin compatible amphoteric surfactant cleansing agent including, but not limited to, surfactants having the capacity of behaving either as an acid or a base. While mild soaps are suitable for use with the invention, surfactants are preferred. Surfactants lift soil off the skin by reducing surface tension, whereas soaps remove protective emollients from the skin and can disturb the skin's normal pH;

Category (b): a skin compatible anti-inflammatory is known to reduce skin reddening. Reddened skin is the first sign of an infection and other skin problems; and indicates that the skin is redirecting its natural resources from growth and other normal functions to prevention and repair. Reducing or eliminating reddening may increase the growth of healthier new skin;

Category (c): a skin compatible anti-foaming agent;

Category (d): a cell growth-promoting agent that promotes or stimulates new skin growth and promotes healing;

Category (e): immune system-enhancing agents that enhance or stimulate the skin's immune system or help provide a secondary immune system. When present in the composition in preferred quantities, these agents promote healing and also help reduce the incidence of infection. Some of these substances may also enhance the skin's natural barrier function. Solutions that meet these criteria and may also be used in the invention, although not necessarily with equivalent results are described in International Patent Application No. PCT/US2013/142374, the contents of which are incorporated herein by reference, to the extent the solution is antiseptic, mildly acidic, and non-antibiotic, and that for cleansing functions zwitterionic surfactants are employed to avoid stripping lipids. The solutions are aqueous mixtures of synthetic, cationic poly-peptides with antimicrobial activity with 10% by weight of the synthetic and cationic poly-peptide comprising at least one pharmaceutically acceptable polymer that is not synthetic, cationic poly-peptide, each present in at least about 100 micro grams/mL based on total aqueous volume and each mutually miscible in water;

Category (f): a fast-acting skin compatible antimicrobial agents that demonstrate effectiveness against a broad spectrum of bacteria when used in effective amount to kill these infectious organisms on and in the skin during skin cleansing and upon drying. The skin itself harbors a wide variety of microorganisms, some of these are potentially harmful while others are beneficial. Ideally, the normal bacterial flora of the skin is not destroyed by cleansing. However, a cleanser that reduces the accumulation of bacteria and fungi present on the skin also helps reduce the incidence of infections, especially in a hospital environment. The selected antimicrobial agent is selected to be fast-acting during cleansing, to rapidly dry in the air, and to be capable of substantially killing viruses, bacteria, fungi, and yeasts present in the living basal cell layer and the dermis of the skin in addition to those transferred onto or living in the dead horny layer or epidermis. This action serves to reduce the occurrence or severity of infections due to bacteria, viruses, and the like infectious microorganisms entering breaks in the skin, whether small tears or micro abrasions. Some antimicrobial agents, such as colloidal silver and polyphenolic quaternary compounds derived from grapefruit or other bioflavonoids, such as the CITRICIDAL® brand, are compatible with the skin's normal flora, and are capable of penetrating into the dermis to provide useful antimicrobial properties. Numerous studies have demonstrated that CITRICIDAL® has many unique and desirable antimicrobial properties, including at least some effectiveness against HIV, hepatitis and other viruses, and a wide range of bacteria, fungi, and yeasts, while being highly biocompatible and providing other benefits to the skin. Tests show that a combination of 2% or less CITRICIDAL® and other agents such as colloidal silver is approximately 99.9% (or more) effective in killing the harmful microorganisms that are usually present on the skin and prevalent in medical institutions. When present in these low concentrations, a composition containing these antimicrobial ingredients typically does not cause skin problems, even when used by volunteers with fragile skin infections or otherwise problem skin;

Category (g): an absorption facilitation agent;

Category (h): a humectant and/or emollient that naturally re-moisturizes the dead horny layer, epidermis, and/or dermis without clogging pores and act to naturally re-moisturize the skin surface (i.e., the dermis) to prevent dryness, increase elasticity, reduce the incidence of skin tears, and supplement the activity of the sebaceous glands to reproduce oils without clogging pores. Over usage of humectants and/or emollients is a major cause of skin eruptions, inflammation, and acne. Simply increasing the amounts of humectants or emulsifiers to provide a longer lasting protective barrier can promote skin problems. The amount of this ingredient is controlled so as to minimize the production of undesirable effects, Category (i): a free radical-scavenging agent that helps detoxify the skin when included in a sufficient quantity and in a form that is delivered deeper than the dead horny layer of the skin;

Category (j): healing promoting agents are selected to form a stable, no-rinse, radiation-sterilizable composition that air-dries quickly when applied to the skin while cleansing and treating the skin;

Category (k): a biocompatible preservative;

Category (l): a plant extract agent;

Category (m): antimicrobial peptide;

Other optional beneficial ingredients;

and the balance of the composition being water.

While the described ingredients have known beneficial effects, the mere presence of an ingredient in the formulation does not automatically result in a product that promotes or assists healing. For, example, allantoin is nontoxic, nonirritating, and nonallergenic, and in concentrations of 0.2% or more is known to help in skin healing; it is an FDA-recognized skin protectant in concentrations of 0.5%. However, allantoin easily comes out of solution when present in concentrations exceeding 1% and must therefore be supported by other similar agents when formulating a solution containing such. It is common practice to add small amounts of aloe vera to cosmetics for its soothing effect as an analgesic (aloe vera contains lignin, saponins, anthraquinones, polysaccharides, and acetylsalicylic acid which blocks the synthesis of prostaglandins). Aloe vera improves wound healing and acts as an anti-inflammation agent.

Each ingredient of a chemical, plant extract, or genetic based composition of the present invention is present as a percentage amount of the total weight of the composition. In each instance, the amount is effective either alone, or synergistically with the other ingredients, to achieve the desired results. It is important to note that the composition of the invention may contain less than all of the ingredient categories and still offer the therapeutic hybrid benefits expected. In a preferred embodiment the composition comprises at least one ingredient selected from: an amphoteric surfactant category (a) ingredient, a skin compatible anti-inflammatory category (b) ingredient, and a skin compel.tible anti-foaming category (c) ingredient; and at least one ingredient selected from: a cell growth promoting category (d) ingredient, an immune system enhancing category (e) ingredient, a fast acting skin compatible antimicrobial category (f) ingredient, an absorption facilitation category (g) ingredient, a humectant and emollient category (h) ingredient, a free radical scavenging category (i) ingredient, and a healing promoting category (j) ingredient.

In another preferred embodiment the composition comprises at least one ingredient selected from: an amphoteric surfactant category (a) ingredient, a skin compatible anti-inflammatory category (b) ingredient, and a skin compatible anti-foaming category (c) ingredient;

at least two different ingredients from each of two different ingredient categories selected from: a cell growth promoting category (d) ingredient, an immune system enhancing category (e) ingredient, a fast acting skin compatible antimicrobial category (f) ingredient, an absorption facilitation category (g) ingredient, a humectant and emollient category (h) ingredient, a free radical scavenging category (i) ingredient, and a healing promoting category (j) ingredient. The specific ingredients selected for a composition, within the scope of the invention, are combined in an aqueous solution.

The components for each category of ingredients of the present invention may be selected from the following:

Category (a): skin compatible amphoteric surfactant cleansing agents include, but are not limited to, cocamidolpropyl betaines, cocamidopropyl hydroxysultaine betaine alkylglucosides, mild soaps, dimethicone and lauryl glucoside and mixtures thereof, Category (b): skin compatible anti-inflammatory agents include, but are not limited to, allantoin ocamidolpropyl betaines, and aloe vera and mixture thereof, Category (c): skin compatible anti-foaming agents include, but are not limited to, dimethicone, silicon-based antifoaming agents dimethicone copolyoc, and mixtures thereof.

Category (d): skin compatible cell growth-promoting agents include, but are not limited to, aloe vera, allantoin, which is glyocyldiureide or 5-ureidohydantoin, beta glucan, polyphenolic compounds such as Citricidal®, bioflavonoids, polyphenolic compounds, and combinations thereof. Allantoin is nontoxic, nonirritating, and nonallergenic, and in concentrations of 0.2% or more is known to help in skin healing; it is an FDA-recognized skin protectant in concentrations of 0.5%. However, allantoin easily comes out of solution when present in concentrations exceeding 1%, and must therefore be supported by other similar agents when formulating a solution containing such. It is common practice to add small amounts of aloe vera to cosmetics for its soothing effect as an analgesic (aloe vera contains lignins, saponins, anthraquinones, polysaccharides, and acetylsalicylic acid which blocks the synthesis of protoglandins). Aloe vera improves wound healing and acts as an anti-inflammation agent.

Category (e) skin compatible immune system-enhancing agents include, but are not limited to, aloe vera, beta glucan, colloidal silver, silver or allantoin, grapefruit and other bioflavonoid-derived polyphenolic quaternary compounds such as CITRICIDAL® brand, and mixtures thereof. Beta glucan, and aloe vera, are also believed to promote healing by mechanisms which are as yet unclear. Beta glucan is believed to stimulate the body's immune system T-cells; mannoproteins and polysaccharides such as aloe vera are also believe to enable the T-cells to be effective. A mannoprotein is a sugar-protein, a glycoprotein, that is linked to beta glucan in yeast and barley cell walls. Mannoproteins directly increase the structural integrity, alertness and numbers of immune cells.

Category (f) fast-acting skin compatible antimicrobial agents include, but are not limited to, *Eucalyptus globulus*, hepar sulphuris, camphor calcareum, exylitol HCL, polyglyceryl-2/autate, grapefruit and other bioflavonoid-derived polyphenolic quaternary compounds such as CITRICIDAL® brand, which demonstrates effectiveness against a broad spectrum of bacteria, colloidal silver, silver, pycnogenol, grape seed extract, bioflavonoids, grapefruit derived quaternary compounds, antibiotics, and combinations thereof. Numerous studies have demonstrated that CITRICIDAL® has many unique and desirable antimicrobial properties, including at least some effectiveness against HIV, hepatitis and other viruses, and a wide range of bacteria, fungi, and yeasts, while being highly biocompatible and providing other benefits to the skin. Tests show that a combination of 2% or less CITRICIDAL® and other agents such as colloidal silver is approximately 99.9% (or more) effective in killing the harmful microorganisms that are usually present on the skin, and prevalent in medical institutions. When present in these low concentrations, the composition containing the antimicrobial ingredient does not cause skin problems, even when used by volunteers with fragile skin infections or otherwise problem skin;

The components of the other functional ingredients, are different from the functional ingredients listed above and include:

Category (g): absorption facilitation agents including, but not limited to, beta glucan, aloe vera, or colloidal silver, silver and mixtures thereof;

Category (h): humectant and/or emollient agents including, but not limited to, aloe vera, cocamidopropyl betaine, allantoin, *Beta vulgaris* toot extract, decylglucoside, diglycerin, glycerin, fructooligo, saccarides, vitamin E (tocopherol), beta glucan, and combinations thereof;

Category (i): free radical-scavenging agents include, but are not limited to, bioflavonoid, a polyphenolic compound, a grapefruit-derived quaternary compound, beta glucan, allantoin, vitamin E, *Lactococcus* fermigent lystate pycnogenol, or grape seed extract, beta glucan, which is a D-glucose polymer (also known as beta-1, 3-glucan, beta-1,6 glucan), yeast extract or yeast derivative that helps detoxify the skin, and grapefruit and other bioflavonoid-derived polyphenolic quaternary compounds such as CITRICIDAL® brand and mixture thereof;

Category (j); healing promoting agents include, but are not limited to, aloe vera, allantoin, or beta glucan, grapefruit and other bioflavonoid-derived polyphenolic quaternary compounds such as CITRICIDAL® brand, and combinations thereof, Category (k): biocompatible preservatives include, but are not limited to, methylparaben, propylparaben, etbylenediaminetetraacetic acid (EDTA), octendiene HCL, diazolidinyl UREA potassium sorbate, and like agents and combinations thereof, Category (l): plant extract agents include, but are not limited to ABS turmeric root extract, croton lechieri resin extract, yucca schidigera, yucca, calcium carbonate, olibguam (frankensense), and angus cutas, angus cutas berry extract; and mixtures thereof;

Category (m): antimicrobial peptides, such as cathelicidin (also known as "LL-37") along with functional variants, fusions and mixtures thereof.

The components of the other optional beneficial agents, include but are not limited to, biocompatible fragrances, such as, natural orange, lemon, lavender, and combinations thereof, vitamins and vitamin precursors, including vitamin A, carotene, cryptoxanthin, retinol, 3-dehydroretinol, vitamin C or absorbic acid, vitamin E or tocopherol, and the like, herbs, including chamomile, lavender, ginseng, ginkgo, and the like, and antioxidants, collagens, pH-balancing agents, cheating agents such as EDTA, solvents such as alcohol and combinations thereof. Some formulations may include additional ingredients, possibly performing preservative functions inhibiting microbial and fungal growth and extending shelf life, such as methyl- and propyl-parabens.

It should be recognized that where a compound is mentioned in two (2) different ingredients categories that the compound serves both functions in the formulation and that each function is present when the compound is present. For example, aloe vera has anti-inflammatory, cell growth promoting, immune system enhancing, absorption facilitating, healing promoting, and humectant an emollient properties; where allantoin has anti-inflammatory, cell growth promoting, immune system enhancing, free radical scavenging, and healing promoting properties; where beta-glucan has cell growth promoting, immune system enhancing, absorption facilitating, free radical scavenging, and healing promoting properties; and grapefruit extracts have immune system enhancing, antimicrobial, and free radical scavenging properties. In addition, polyphenolics, bioflavonoids, pyncogenol, and grape seed extract may be used for some of these functions in the formulation or to supplement the other ingredients. The component(s) for each of the functional ingredient categories are selected to form a stable, no-rinse, radiation sterilizable compositions that air-dry quickly when applied to the skin, are antiseptic cleansing and treat antimicrobials and biofilms occurring on the surface of mammalian skin.

Each of the selected ingredients are preferably different in function from the other ingredients so that each selected ingredient is individually present in sufficient quantity to perform its function or functions. By way of example, if aloe vera is selected as a component for an ingredient category, such as skin compatible anti-inflammatory agent, then a suitable component for another ingredient category, where aloe vera would also have been an option, would not be aloe vera, but rather, for example, allantoin, or some other functionally equivalent component for the other ingredient.

The specific ingredients selected from the different ingredients categories for formulation are selected to be compatible with each other, and with human skin, even after exposure to temperatures in the range of from 0° F. to 140° F. and sterilization by gamma or E-beam radiation.

For example, colloidal silver kills single cell microorganisms such as bacteria by penetrating their cell walls in a manner similar to the body's T-cells. Therefore, these organisms cannot mutate into resistant strains as they do with many other antimicrobial agents.

The colloidal silver component ingredient in a composition of the present invention, is preferably formulated with particles that are small enough to penetrate the dermis, which is approximately 0.08 to 34 nanometers. However, typically colloidal silver has limited potency and must preferably be supplemented when used as an antimicrobial ingredient, with other antimicrobial agents in formulating compositions of the invention. It has been surprisingly found that the use of a high purity silver (i.e. silver with a purity of 99.9%) having a small particle size and average particle size distribution provides compositions offering the advantage and benefit of reducing the inflammatory response in traumatized tissue, in particular muscle tissue, and inhibiting cytokine production, thus limiting the impact of cytokine cascade reactions, including an inflammatory cascade. While not wishing to be bound by theory, it is believed that the small particle size of the silver causes the silver to be small enough for trans-dermal migration into muscle tissue so that more silver is available at a greater depth in the dermis to more effectively inhibit cytokine production that contributes to the inflammatory cascade. The concentration of the small particle size, high purity silver will typically range from 50 to 11100 ppm.

Non-steroidal anti-inflammatory drugs, or NSAIDs, include aspirin, ibuprofen, and naproxen, are among the most frequently prescribed anti-inflammatories the world, and are frequently prescribed and used for a variety of pain relief. However, the existing multiple risks of gastrointestinal problems, high blood pressure, and kidney damage cause NSAIDs to be unattractive for consistent use in pain relief associated with inflammation. Thus, the use of compositions of the present invention, containing colloidal silver, offers many properties similar to that of an NSAID without the aforementioned negative impacts.

The antiseptic skin cleansing and maintenance aspects of the composition of the invention, are exemplified in U.S. Pat. No. 10,046,137 B2, entitled Method for Maintenance of Urethral Catheters, where catheter acquired urinary tract infections are proven to be prevented or substantially reduced in frequency, occurrence, and reoccurrence with the composition of the U.S. Patent. The composition in the U.S. Patent decolonized the delicate perineum, the urinary meatus, and the contiguous mucosa surrounding the catheter insertion site and maintained these delicate areas in a state that resists infection. Another exemplification is shown in the U.S. Patent where post-withdrawal maintenance treatment steps, in which the perineum, urinary meatus, and mucosa, are continually wiped at regular intervals for a sufficient period of time after withdrawal and the composition reduced or precluded any infection attributable to the use of a catheter. Additional compositions that exemplify the antiseptic skin cleansing aspect of the composition is found in Huckfeldt et al. U.S. patent application Ser. No. 13/095,708, entitled Composition for Skin Sanitization and Protection and Method for its Use, and Bevilacqua et al. U.S. patent application Ser. No. 14/385,752, entitled Compositions and Uses of Antimicrobial Materials with Tissue-Compatible Properties, the contents of these two applications are incorporated herein by reference in their entirety.

Preferably the compositions promote increased blood circulation in the treated areas, promoting absorption of beneficial ingredients as the skin equilibrates.

The overall antiseptic and cleansing function of the composition is to soften and remove dead horny layer without stripping the skin of its natural oils, re-moisturize horny layer and the epidermis and provide some retained moisture to the dermis and promote the replacement of oils removed during cleansing and further absorption into the dermis with ingredients of sufficiently small particle size.

It is helpful and increases absorption and effectiveness of the composition of the invention to warm it before application, most especially, although not exclusively, in connection with high risk decolonization. Not only is the solution more pleasant for the patient or health care worker to whom it is applied, but the increase in absorption improves penetration and effectiveness thereby. Typically, the composition or the pre-moistened wipes containing the composition are heated to an average of about 105° F. in warmer boxes especially adapted to carry the pouches of pre-moistened cloths. The solution should not be heated over about 125° F.

A key aspect of the antiseptic skin cleansing and maintenance composition is the ability of the composition to be treated under methods typically used for solution sterilization, including, for example radiation. All ingredients selected for use in the formulation preferably compatible and gamma-sterilizable, resulting in a stable composition (i.e. compositions that do not degrade or undergo cross-reactions as a result of sterilization or at elevated temperatures). The ingredients used within the formula all are compatible with radiation, including gamma and e-beam radiation. However, the ingredients may also be compatible with other sterilization techniques approved by the FDA including, but not limited to, dry heat, ethylene oxide gas, steam, hydrogen peroxide gas plasma, and ozone. The ingredients may also be compatible with novel treatments not currently considered by the FDA including, chlorine dioxide, ethylene oxide-in-a-bag, high intensity light, microwave radiation, sound waves, ultraviolet light, and vaporized chemical sterilizing systems. According to the Centers for Disease Control, "Any item, device, or solution is considered to be sterile when it is completely free of all living microorganisms and viruses." The definition is categorical and absolute, meaning an item is either sterile or it is not. A sterilization procedure is one that kills all microorganisms, including high numbers of bacterial endospores. Nevertheless, from an operational standpoint, a sterilization cannot be so categorically defined. Rather, the procedure is defined as a process, after which the probability of a microorganism surviving on an item subjected to treatment is less than one in one million ($10^{-6}$). This is referred to as the "sterility assurance level." A description of various sterilization techniques mentioned is detailed below.

Sterilization treatment methods preserve the efficacy of the ingredients of the solution and allow ingredients with antimicrobial properties to expend their energy fighting organism outside of their container, instead of inside the container acting themselves as a preservative and losing efficacy. Essentially, having antibacterial ingredients in a gamma treated composition allows those antibacterial ingredients to maintain their efficacy because they are not attacking organisms within the composition itself. This in effect extends the shelf life of the ingredients. If the composition was not sterilized, the bio-burden would increase and the efficacy of the composition in terms of fighting antimicrobial activity would decline.

Gamma radiation at 35 kGy has been determined to provide an efficacious composition or one that is assured sterility at $10^{-6}$ to $10^{-8}$, but the intense radiation yellows the product. Preferred is sterility of $10^{-2}$ or $10^{-3}$ to $10^{-6}$. A radiation dose of 4 to 7 kGy typically reaches a sterility of $10^{-2}$.

It should be understood that the composition used in connection with the method need not be subjected to a sterilization dose but can be quite effective submitted to a treatment dose. Typically, the mixtures used in connection with the compositions are treated in individual packages, not in bulk, although it should be recognized that bulk treatment may also be suitable.

The antiseptic skin cleansing and maintenance aspects of the compositions of the invention are suitable for single or multiple applications, including direct application as a liquid, ointment, cream, liniment, salve, lotion, foam, gel, or impregnated cloth to intact skin, disrupted skin, mucous membranes, transitional areas, meatuses and muscle tissue. The compositions may also be present and applied as a liquid, soap, gel, suspension, lotion, solution, paste, spray, aerosol, oil, or as a cosmetic.

The antiseptic skin cleansing and maintenance aspects of the compositions of the invention may be formulated to be effective as foaming chemistries, capable of demonstrating enhanced surface retention time when formulated to have a foaming profile. As a result, applications of the composition to a surface in contact with a biofilm can include the administration of a defoaming agent or chemistry.

The antiseptic skin cleansing and maintenance aspects of the compositions of the invention, generally speaking, improve the normal functions of skin and thereby improve permeability and antimicrobial barrier and the immunological defense properties of the host, which are interrelated and co-dependent, for both damaged skin and intact healthy skin at risk for damage. By interrelated and co-dependent, we mean that both the permeability barrier function and antimicrobial and chemical barriers are improved and that both are necessary to healthy functioning of the tissues. A compromised permeability barrier not only contributes to excessive trans-epidermal water loss, but also provides ingress for bacteria, viruses, and chemical attack. A compromise antimicrobial barrier can result in an infection, which compromises the permeability barrier.

The antiseptic skin cleansing and maintenance aspects of the compositions of the invention also impact the integumentary system of the body, including the integrated tissues of the stratum corneum, mucous membranes, transitional surfaces between mucous membrane and stratum corneum, the supporting capillary beds, and underlying muscle tissue. The composition is tissue penetrating and absorbed into the tissues, having a beneficial impact on pH and oxygen and waste transport that can enable compromise tissues to heal and intact tissues to be protected beyond their normal capacity.

The antiseptic skin cleansing and maintenance aspects of the compositions of the invention can substantially prevent, reduce the likelihood of, or support the reversal by the skin of compromised permeability barrier and antimicrobial function by contacting the composition with damaged or at-risk tissues initially and upon a regular periodic basis for so long as the damage or risk is present, and continuing the application until such a time that the risk of damage is deemed sufficiently passed. The method of continual regular periodic application allows penetration into the deeper layers of the tissue, including the capillary bed and the underlying muscle tissue. This method of application, applying the composition initially and on a periodic basis and for a time after until the risk for damage has subsided, can impact the interactions of the skin and muscle to prevent and substantially reduce the severity of muscle cramps, the "lactic acid" threshold, trans-epidermal water loss, and muscle recovery, to name a few.

The stratum corneum plays a key role in many physiological pathways. By improving the functioning of the stratum corneum, even that of intact skin, we allow the antimicrobial and co-dependent permeability barriers to function at an enhanced level. The antimicrobial activity of the skin and the barrier repair permeability are inseparable and their enhancement or restoration influence many factors including stratum corneum hydration, ultra-violet defense, antioxidant defense, mechanical defense, immunological defenses and the neurosensory interface. By recognizing these mechanisms, previously not recognized in the use of related solutions for antiseptic skin cleansing to avoid the harsh impact of soaps, other antiseptics, and the like, there is a pathogenesis-based therapy enabling benefit that includes improvement and enhancement of stratum corneum characteristics, the properties of mucous membranes, meatuses, transitional areas between the stratum corneum and mucous membranes, and muscle tissue.

The antiseptic skin cleansing and maintenance aspects of the compositions of the invention mitigate biological mechanisms that can lead to a diseased state in healthy skin or assist in repairing skin that is already damaged.

Application of the antiseptic skin cleansing and maintenance aspects of the compositions of the invention to intact skin not only enhance the skin's function but also decolonize the skin of harmful bacteria and viruses without negatively impacting the balance of beneficial flora. Suggested applications to intact skin where decolonization would be useful include: catheter care, bathing intensive care patients in procedures specifically designed for decolonization and maintenance in a decolonized state; urinary collection for reducing the likelihood of sample contamination; decolonizing the perineum and surrounding areas, particularly after an incidence of incontinence or prior to inserting a urinary catheter; T-zone decolonization, including the seven openings to the body that provide unique and frequently used pathways for viral and bacterial infection, especially the nares; pre-operative and general application to the nares when aerosolized infectious agents are anticipated; pre-operative site preparation; pre-injection site preparation, prophylactic decolonization for patient transfer, as from an extended care facility to a hospital, upon admission to emergency care, or upon transfer from emergency care to intensive care; site preparation and maintenance of a central line patch; neonatal and elderly adult decolonization and skin enhancement where skin pH is known to be on the alkaline side and at a level that could promote microbial colonization and infection; decolonization following any episode of fecal and urinary incontinence to prevent disease; hand decolonization, decolonization of patients during end-of-life care; decolonization of infected or potentially infected tissues post-mortem; decolonizing foot care and especially diabetic skin care for improving the function of the thicker stratum corneum characterizing the feet and the likelihood of infection associated with higher glucose near-surface capillary blood supply in the feet, which is known to promote infections, including cellulitis and the like; initial, continual periodic, and maintenance cleansing to avoid the chronic itching associated with pruritus; feminine wipes and daily care; baby wipes and daily care; body deodorants for chronic odor control; eye drops for mammals; conjunctivitis; ear drops for mammals; oral care for mammals; initial, continual periodic, and maintenance application to warts and skin tags; shampoos; makeup removers; shaving creams; application to the skin in the event of episodic pseudofolliculitis barbae; initial, continual periodic, and maintenance applications in the use of facial cleansers, cosmetics, primers and the like to avoid or treat and reduce the recurrence of acne and the like.

The antiseptic skin cleansing and maintenance aspects of the compositions of the invention may also be applied to parts of the integumentary system that are disrupted or exposed, including, for example, muscle and capillary tissue in chronic wounds and burns. The method of the invention may be applied to the initial, continual periodic, and maintenance application treatment of atopic and contact dermatitis, impetigo, acne, diabetic ulcers, venous stasis ulcers, pressure ulcers, mouth ulcers, dermatosis, excema, cellulitis, treatment of a C-section incision site, episiotomy incision site, diaper rash, hemorrhoids, rosacea, skin that has been compromised by laser or radiation treatments or burns, including first, second, and third degree burns, blister care, wound debridement, poison ivy rash, shingles lesions, chicken pox lesions, hives, insect bites, toe nail fungus, and inflammation.

One unique feature attributable to the antiseptic skin cleansing and maintenance aspects of the compositions of the invention is its efficacy on mucous membranes, a sensitive type of tissue that is especially susceptible to harsh ingredients. The invention has potential uses for irrigation of the bladder, colon, vagina, nares and nasal passages, and rinsing of the oral cavity. The method of the invention as applied to burns where the skin and its integrated and associated tissues have been damaged also see benefits from enhancing the skin's normal functions. Applications to burns includes first-degree, second-degree, and third-degree burns, as well as sunburns on the skin.

The antiseptic skin cleansing and maintenance aspects of the compositions of the invention demonstrate initial, continual periodic, and maintenance application to the tissues to enhance barrier repair therapy by reducing the pH to prevent infection and increase oxygen uptake. These two functions of reducing the pH and increasing oxygen uptake speeding healing, keeping skin and muscle tissue healthy and able to fight off a potential infection until such time as a skin graft can be provided or the skin otherwise repaired.

The antiseptic skin cleansing and maintenance aspects of the compositions of the invention may also be applied to the integumentary system via intact skin to influence the associated tissues, including muscles and the capillary system. Application to the skin can impact interactions between muscle tissue and the layers of the skin. Appreciable effects may be achieved for relieving muscle cramping, trans-epidermal water loss, reducing lactic acid, reducing inter-muscular inflammation, reducing exercise-induced heat, increasing range of motion, speeding transport of excretion products of muscle metabolism, oxidative stress capacity, restless leg syndrome, and neuropathy.

The antiseptic skin cleansing and maintenance aspects of the compositions of the invention are believed to affect muscle tissue in the following three ways, all related to initial, continual regular periodic, and maintenance lowering of the skin's pH via acidification of the stratum corneum and enhancing anti-inflammatory response. First is the limiting of trans-epidermal water ("TEWL") loss. Second is improved oxygenation, and third is improved transport of waste products and reduced inflammatory response. Lowering the pH of the skin limit TEWL. The average person loses 1.5 to 2.0 liters of water a day through the skin. Perspiration makes the pH of the skin go up. TEWL increases as more water is lost through the skin and increases the risk of cramping. Using The antiseptic skin cleansing aspects of the compositions of the present invention help regulate the pH of the skin allows limiting TEWL and can relieve cramping.

There is more blood in the skin than any other part of the body. Therefore, lower the pH of the stratum corneum, thereby impacting the capillary bed to carry and enabling more transport of oxygen and waste products, which assists in reducing inflammatory response.

The plurality of ingredients making up the composition of the present invention, exhibit a synergistic impact that is particularly useful in providing the hybrid therapeutic benefits of antiseptic cleansing and maintaining, nourishing and moisturizing of the stratum corneum of the skin tissue and other tissue and simultaneously treating biofilms occurring on the surface of skin, especially those that occur in association with chronic wounds and burns, and provide the skin an opportunity to improve by engaging its own natural barrier and immunological defense properties. The composition of the invention, causes no side effects, eliminates or substantially reduces, microbiological resistance, and allows for the optimization of the various defensive functions of the stratum corneum.

The pH of the composition of the present invention is preferably close to 4.5 to 6.7 and close to the pH of human skin, although compositions with a pH outside this range may also be useful. The composition is naturally pH-balanced when formulated with appropriately selected ingredients. The composition reduces and maintains the pH of the stratum corneum at a level of from 4.0 to 5.5 or 6.0 over an extended period of time, especially when used according to the protocols of the invention to provide regular continual periodic applications. Generally speaking, the solutions are non-antibiotic but antimicrobial, mildly acidic to pH about 4.0, and zwitterionic when used with a surfactant ingredient for cleansing that is non-polar and does not strip the skin tissue of beneficial lipids. The method of using the compositions of the present invention requires acidifying the tissue from the outermost surface of the stratum corneum of the tissue to the innermost surface of the stratum corneum throughout its thickness to a substantially uniform acidic pH within the range from 4.5 to 6.7, by continual applying the composition to the tissue over an extended periodic and until such time that the infection has sufficiently subsided. It is then important to maintain such uniform acidic pH of the tissue within the range of from about 4.5 to 6.7 by re-applying the composition over continual regular periodic intervals. The compositions of the invention promote antimicrobial properties in the absence of damage to the skin and muscle tissue; promote healing of existing chronic wounds and burns; and create a zone of inhibition around the chronic wound or burn or decolonized region to preclude recontamination or infection or at least substantially reduce the likelihood of contamination and infection.

The zone of inhibition is a complex phenomenon recognized in connection with the invention that includes not only lowering the pH of the tissue to inhibit bacterial colonization, but orderly desquamation of epithelial tissues in a well-maintained bricks-and-mortar structure of keratinized cells, proteins, enzymes, and a lipid matrix. Unlike normal skin, which has a steep pH gradient from the acidic outer surface of the stratum corneum to the considerably more alkaline pH of the inner surface of the stratum granulosum, skin to which the solution is applied on a continual regular periodic basis has been determined to exhibit a relatively uniform acidic pH throughout its surface. This uniform pH is thought to "super-normalize" the skin, enhancing blood flow in the capillary system of the largest organ in the body, increasing oxygenation of the underlying muscle tissue and the skin, promoting clearance of metabolic products, promoting moisture barrier functions to avoid trans-epidermal water loss, and altering the pH of the skin adjacent normally neutral-to-alkaline blood, which blood tends to promote bacterial growth otherwise if exposed to the elements unprotected by fully functioning skin. Damaged stratum corneum is said to be capable of losing up to 6 liters of water per day by trans-epidermal water loss and may allow ingress of chemical agents and pathogens. Thus, the fully acidified stratum corneum enhances the ability of the skin to ward off infection.

Potential solutions that are antiseptic and antimicrobial, having a pH of from about 4.0 to 6.0, and including the functionalities of category ingredients of the invention being anti-inflammatory, antifoaming, cell growth promoting, immune system enhancing, antimicrobial, absorptive into the skin, and scavenging free radicals which can include, for example, mixtures of aloe, dimethicone, allantoin, cocamidopropyl betaine, citrus-based extracts including Citricidal® brand quaternary compound derived from grapefruit, colloidal silver, and vitamin E; mixtures of aloe, dimethicone, allantoin, and colloidal silver or grapefruit extract; mixtures of dimethicone, allantoin, grapefruit extract, colloidal silver, and vitamin E; mixtures of aloe, dimethicone, cocamidolpropyl betaine, grapefruit extract, and colloidal silver; mixtures of aloe, dimethicone, grapefruit extract, and colloidal silver; and mixtures of dimethicone, cocamidolpropyl betaine, colloidal silver, and Beta-glucan. If desired, the pH of the antiseptic solution can be adjusted by adding an acid (e.g. citric acid) a base (e.g. sodium hydroxide) or can be buffered with citrate phosphate benzoate or bicarbonate buffering salts.

Provided are compositions and methods of the present invention proven useful to control and eradicate chronic infection on the surface of mammalian tissue. Compositions of the present invention may contain cathelicidin, otherwise known as the antimicrobial peptide LL-37, which has been surprisingly discovered to be useful in methods to inhibit microbial infection and treat biofilms. In one embodiment, an LL-37 peptide containing composition of the present invention can have both bacteriostatic and bactericidal activity and may be used in the treatment of infectious mammalian tissue (e.g. skin) diseases and disorders when applied topically or administered systemically to reduce the severity of infection caused by microbial infection, such as for example (*S. aureus* and *Streptococcus*). LL-37 is a normal bacteria that lives on skin to protect against disease causing bacteria, and because of its natural abundance, it is predicted to be effective. Treatment of infectious skin diseases and disorders with compositions containing the LL-37 antimicrobial peptide would result in clearance of infections caused, for example, by *Streptococcus* or *S. aureus* bacteria and their biofilms.

The compositions and methods of the invention also provide a novel treatment of antimicrobials and biofilms compared with existing antibiotics or surface antiseptics, since the compositions of the invention offer the hybrid therapeutic benefits of treating the inflammation associated with chronic infections of mammalian tissue caused by microbials while simultaneously providing antiseptic cleansing and maintenance of the tissue and an opportunity for the tissue to improve by engaging the host's own natural barrier and immunological defense properties. Therefore, treatment of skin tissue or systemic disorders, biofilms, infectious or non-infectious diseases, with topical compositions of the present invention, would result in faster recovery from many dermatological diseases, including wounds, diabetic ulcers, acne, rosacea, atopic dermatitis, pyodermas, burn wounds, virus catheter infections, corona viruses, *Streptococcus, Staphylococcus aureus* and other dermatological diseases.

Compositions of the invention, containing the LL-37 antimicrobial peptide, can be used to: create an antimicrobial therapy while simultaneously enhancing the immune response to accelerate wound healing in normal and in immunocompromised patients. The compositions can also be used in a method for inhibiting the growth of a bacterium, yeast, fungal or viral biofilms by contacting the bacterium, yeast fungal or viral biofilm with an inhibiting effective amount of a composition. The compositions of the invention can also be used in a method of treating bacterial or viral infections or dermatological diseases or disorders. Finally, the compositions of the invention can be used in a method for treating or preventing an inflammatory disease or disorder.

So long as there is a need for protection against infection, the evaluation of host responses that contribute to the control of bacterial, yeast, fungal and viral infections is an important goal. In addition, modulating inflammation as a result of such chronic infections as well as inflammation resulting from autoimmune and contact with inflammatory agents is important. Compositions of the present invention, containing plant based extracts or LL-37 antimicrobial peptides, reduce the production of pro-inflammatory mediators.

In humans, there are several classes of known antimicrobial peptides (AMPs) including α-defensins, β-defensins, and cathelicidins (LL-37). There are, in addition, linear amphipathic cationic peptides from other organisms, including magainins, cecropins, dermaseptin, δ-lysin (delta haemolysin), phenol soluble modulin-delta or melittin. *Staphylococcus epidermidis* (Se) is a less common cause of opportunistic infections than *S. aureus*, but is still significant. *S. epidermis* is a major component of the skin flora and thus commonly a contaminant of cultures. *S. epidermidis* has been found to inhibit the growth of *Staphylococcus aureus* and Group A *Streptococcus*, the two leading causes of human skin infections and wound infections. Using biochemical and molecular biology techniques the disclosure demonstrates the biological factors produced by *S. epidermidis* have beneficial properties. These biological factors have effects upon microbial defense and inflammation. Accordingly, the compositions of the present invention, provide a method of treating that take advantage of the biological factors produced by *S. epidermidis* and other related microbes.

Also included within the scope of the compositions of the present invention, are functional variants of the peptide that are in an altered form. Herein, the term "variant" includes an LL-37 antimicrobial peptide functional variant in which at least one amino acid is substituted with another amino acid. The term "reference" peptide means any of the LL-37 antimicrobial peptide functional variants and the term "derivative" is a hybrid peptide that includes at least a portion of each of two or more LL-37 antimicrobial peptide functional variants produced by adding one or a few amino acids to an LL-37 peptide without completely inhibiting the activity of the peptide. C-terminal derivatives, e.g., C-terminal methyl esters, are encompassed by the definition.

The compositions of the present invention, also include peptides that are conservative variations of those peptides; where the term "conservative variation" denotes a peptide in which at least one amino acid is replaced by another, biologically similar residue. Examples of conservative variations include the substitution of one hydrophobic residue, such as isoleucine, valine, leucine, alanine, cysteine, glycine, phenylalanine, proline, tryptophan, tyrosine, norleucine or methionine for another, or the substitution of one polar residue for another, such as the substitution of arginine for lysine, glutamic for aspartic acid, or glutamine for asparagine, and the like. Neutral hydrophilic amino acids that can be substituted for one another include asparagine, glutamine, serine and threonine. The term "conservative variation" also encompasses a peptide having a substituted amino acid in place of an unsubstituted parent amino acid; typically, antibodies raised to the substituted peptide also specifically bind the unsubstituted peptide.

LL-37 functional variants can be identified by screening a large collection, or library, of random peptides using, for example, one of a number of animal models such as CRAMP knockout mice that display increased susceptibility to skin infections.

Peptide libraries include, for example, tagged chemical libraries comprising peptides and peptidomimetic molecules. Peptide libraries also comprise those generated by phage display technology. Phage display technology includes the expression of peptide molecules on the surface of phage as well as other methodologies by which a protein ligand is or can be associated with the nucleic acid which encodes it. Methods for the production of phage display libraries, including vectors and methods of diversifying the population of peptides, which are expressed, are known in the art (see, for example, Smith and Scott, Methods Enzymol. 217:228-257 (1993); Scott and Smith, Science 249: 386-390 (1990); and Huse, WO 91/07141 and WO 91/07149). These or other known methods can be used to produce a phage display library, from which the displayed peptides can be cleaved and assayed for antibacterial activity. If desired, a population of peptides can be assayed for activity, and an active population can be subdivided and the assay repeated in order to isolate an active peptide from the population. Other methods for producing peptides useful in the compositions of the present invention, and also provide a method of treatment, include, for example, rational design and mutagenesis based on the amino acid sequences of an LL-37 peptide functional variant.

An LL-37 functional variant can be a peptide mimetic, which is a non-amino acid chemical structure that mimics the structure of the LL-37 peptide, yet retains antimicrobial/antibacterial/antiviral activity. Such a mimetic generally is characterized as exhibiting similar physical characteristics such as size, charge or hydrophobicity in the same spatial arrangement found in the LL-37 functional variant counterpart. A specific example of a peptide mimetic is a compound in which the amide bond between one or more of the amino acids is replaced, for example, by a carbon-carbon bond or other bond well known in the art (see, for example, Sawyer, Peptide Based Drug Design, ACS, Washington (1995)). The amino acids of an LL-37 functional variant, or peptide mimetic, are selected from the twenty naturally occurring amino acids, including, unless stated otherwise, L-amino acids and D-amino acids. The use of D-amino acids are particularly useful for increasing the life of a peptide. Peptides incorporating D-amino acids are resistant to proteolytic digestion. The term amino acid also refers to compounds such as chemically modified amino acids including amino acid analogs, naturally occurring amino acids that are not usually incorporated into proteins such as norleucine, and chemically synthesized compounds having properties known in the art to be characteristic of an amino acid, provided that the compound can be substituted within a peptide such that it retains its biological activity. For example, glutamine can be an amino acid analog of asparagine, provided that it can be substituted within an active fragment of an LL-37 functional variant and the like such that it continues to provide for a composition that retains its antimicrobial activity. Other examples of amino acids and amino acids analogs are listed in Gross and Meienhofer, The Peptides: Analysis, Synthesis, Biology, Academic Press, Inc., New York (1983). An amino acid also can be an amino acid mimetic, which is a structure that exhibits substantially the same spatial arrangement of functional groups as an amino acid but does not necessarily have both the "-amino" and "-carboxyl" groups characteristic of an amino acid.

The activity of the LL-37 peptide can be determined using conventional methods known to those of skill in the art, such as in a "minimal inhibitory concentration (MIC)", whereby the lowest concentration at which no change in OD is observed for a given period of time is recorded as the MIC. Alternatively, a fractional inhibitory concentration (FIC) assay can be used to measure synergy between the peptides of the disclosure, or the peptides in combination with known antibiotics. FICs can be performed by checkerboard titrations of peptides in one dimension of a microtiter plate, and of antibiotics in the other dimension, for example. The FIC is a function of the impact of one antibiotic on the MIC of the other and vice versa. A FIC of 1 indicates that the influence of the compounds is additive and a FIC of less than 1 indicates that the compounds act synergistically.

Any of various art-known methods for protein purification can be used to isolate the LL-37 peptide used in the compositions of the present invention. For example, preparative chromatographic separations and immunological separations (such as those employing monoclonal or polyclonal antibodies) can be used. Carrier peptides can facilitate isolation of fusion proteins that include the peptides of the disclosure. Purification tags can be operably linked to an LL-37 or functional variant. For example, the pOprF-peptide, which is the N-terminal half of the *P. aeruginosa* outer membrane protein F, can readily be purified because it is the prominent protein species in outer membrane preparations. If desired, the fusion peptides can be purified using reagents that are specifically reactive with (e.g., specifically bind) the delta haemolysin or phenol soluble modulin-delta or functional variant of the fusion peptide. For example, monoclonal or polyclonal antibodies that specifically bind the delta haemolysin or phenol soluble modulin-delta or functional variant can be used in conventional purification methods. Techniques for producing such antibodies are well known in the art.

A fusion construct comprising an LL-37 peptide linked to a LL-37 peptide functional variant can be linked at either the amino or carboxy terminus of the peptide. Typically, the resulting fusion peptide has a net charge that is neutral or negative. The peptide or linked to a peptide can correspond in sequence to a naturally-occurring protein or can be entirely artificial in design.

In another aspect, a linker moiety comprising a protease cleavage site may be operably linked to an LL-37 peptide or functional variant thereof. Because protease cleavage recognition sequences generally are only a few amino acids in length, the linker moiety can include the recognition sequence within flexible spacer amino acid sequences, such as GGGGS (SEQ ID NO: 8). For example, a linker moiety including a cleavage recognition sequence for Adenovirus endopeptidase could have the sequence GGGGGGSMFG GAKKRSGGGG GG (SEQ ID NO:9). If desired, the spacer DNA sequence can encode a protein recognition site for cleavage of the carrier peptide from the LL-37 peptide or functional variant. Examples of such spacer DNA sequences include, but are not limited to, protease cleavage sequences, such as that for Factor Xa protease, the methionine, tryptophan and glutamic acid codon sequences, and the pre-pro defensin sequence. Factor Xa is used for proteolytic cleavage at the Factor Xa protease cleavage sequence, while chemical cleavage by cyanogen bromide treatment releases the peptide at the methionine or related codons. In addition, the fused product can be cleaved by insertion of a codon for tryptophan (cleavable by o-iodosobenzoic acid) or glutamic acid (cleavable by *Staphylococcus* protease). While insertion of such spacer oligonucleotides is not a requirement for the production of LL-37 peptides or functional variants, such oligonucleotides can enhance the stability of the fusion peptide.

The terms "purified" and "substantially purified" as used herein refer to a peptide that is substantially free of other proteins, lipids, and polynucleotides (e.g., cellular components with which an in vivo-produced peptide would naturally be associated). Typically, the peptide is at least 70%, 80%, or most commonly 90% pure by weight.

The compositions of the present invention, also provide a method of treating antimicrobial activity in vitro and in vivo.

The mechanisms by which the compositions of the present invention, containing LL-37 antimicrobial peptide, kills bacteria, virus, yeast and fungi can be through binding of the peptide to the microbial cell membrane, after which the membrane's proton gradient and integrity are lost.

Figure 4:
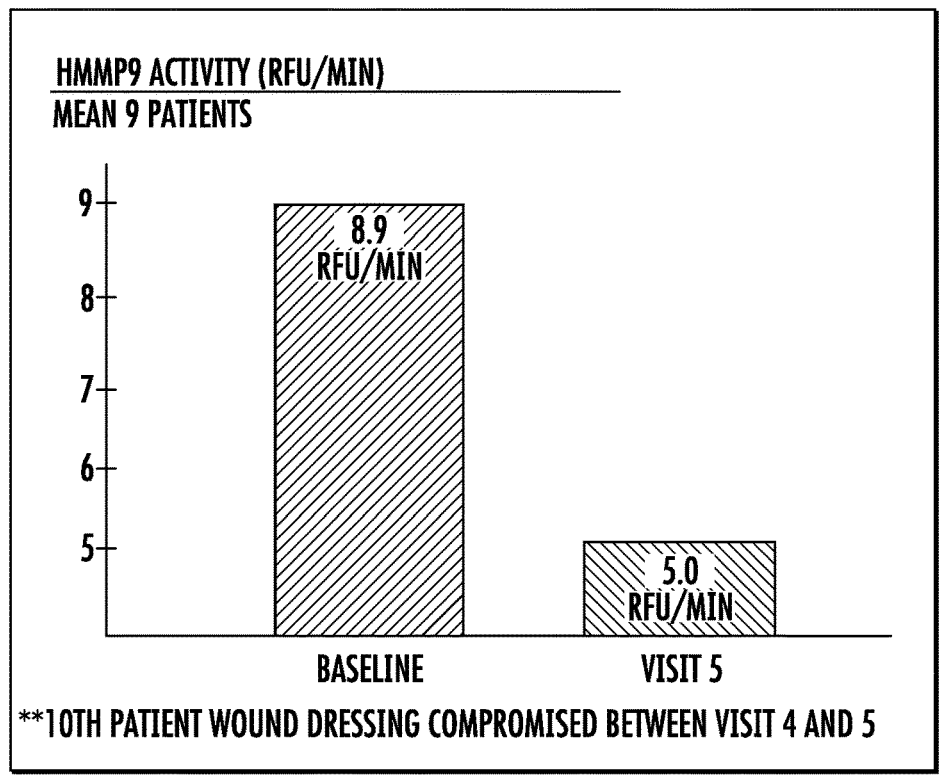
Figure 5:
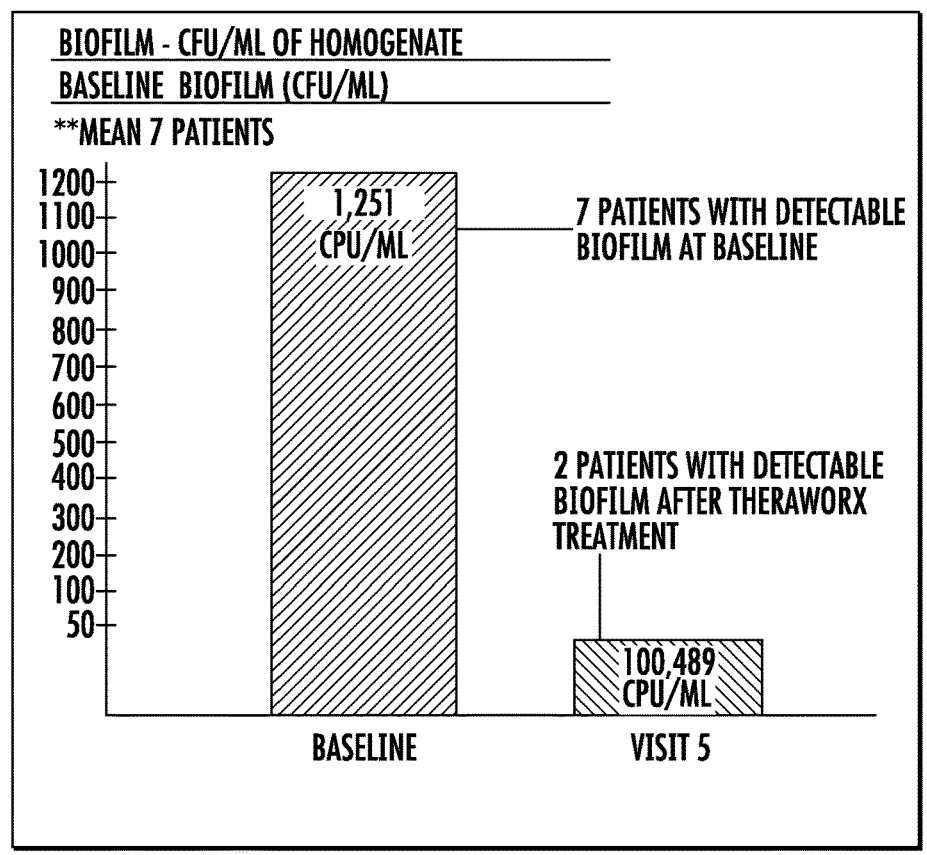
Figure 6:
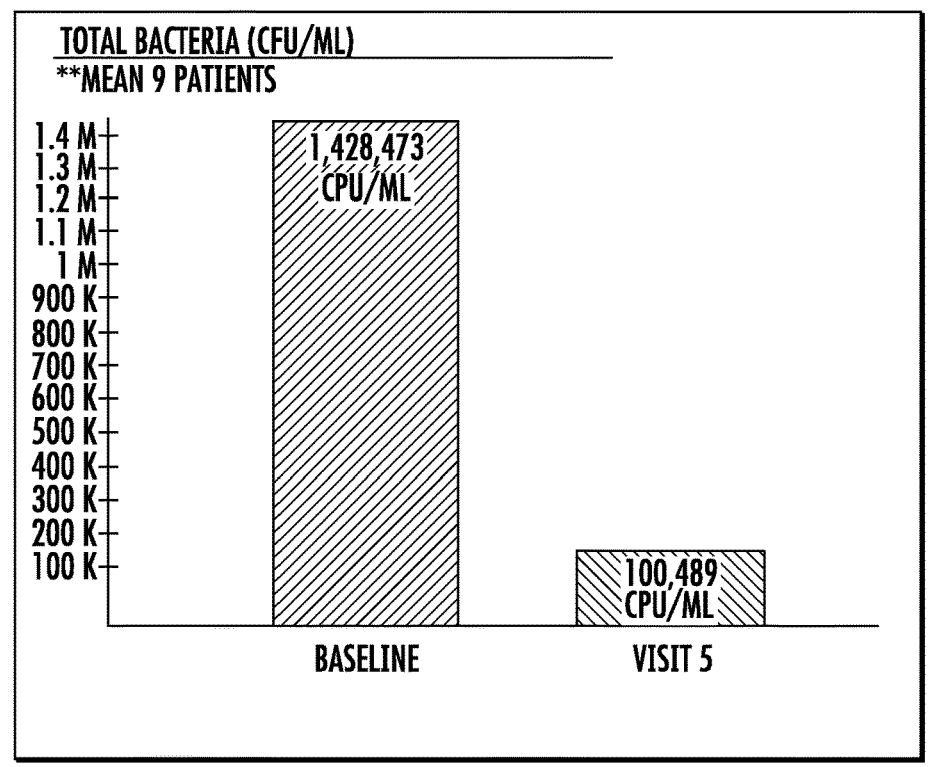
Figure 7:
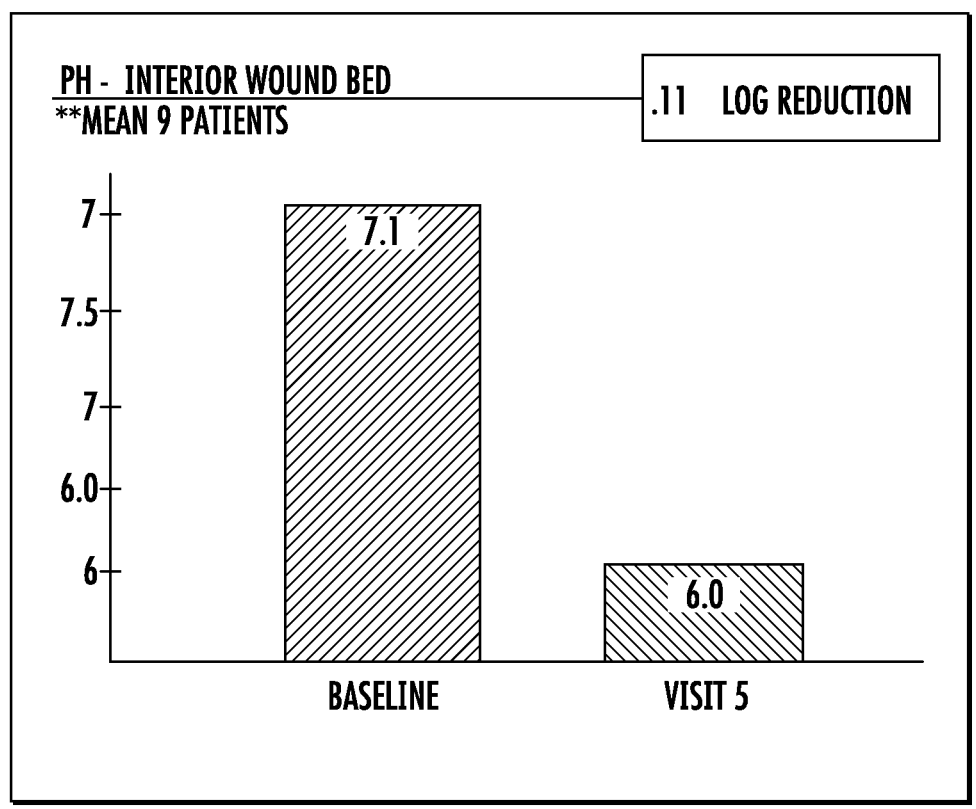

The presence of Se on normal skin, inhibits Group A *Streptococcus* (GAS) survival when compared to skin that had been previously sanitized with alcohol. Growth of GAS on agar media was also inhibited upon co-culture with Se. GAS growth in THB media as measured by $OD_{600}$ and on agar as measured by radial diffusion (clear zone of 28.26 mm$^2$), was inhibited by the addition of cell-free culture supernatants prepared from Se. Inhibition of GAS due to Se conditioned supernatants was statistically significant at 6, 8, and 12 hours (p<0.001) compared to growth in the absence of Se or conditioned supernatants prepared from other bacteria such as *Staphylococcus aureus*. A factor present in Se was hypothesized to be the inhibitor. In initial studies, supernatant from conditioned Se was purified by HPLC and antimicrobial activity identified by radial diffusion assay. Maximal activity eluted at 72% acetonitrile/0.1% trifluoroacetic acid (clear zone of 17.86 mm$^2$). MALDI TOF-TOF identified a peptide in this fraction known as delta-haemolysin, a membrane active peptide of unknown function in Se. Synthetic LL-37 peptide had an MIC and MBC of 16 µM when tested with GAS (FIG. 4). Subsequent studies, described in further detail below, showed that there was an initial additional inhibitory factor present in Se. Overall, the studies show a role of Se in cutaneous protection against infection, a first line of defense of the skin is the resident microflora itself.

The terms "contacting" and" applying" refers to exposing the bacterium to one or more compositions of the present invention, containing LL-37 antimicrobial peptide or a functional variant peptide, so that the peptide can inhibit, kill, or lyse bacteria. Contacting of an organism with the compositions of the present invention, containing LL-37 antimicrobial peptide, can occur in vitro, for example, by adding the peptide to a bacterial culture to test for susceptibility of the bacteria to the peptide, or contacting a bacterially contaminated surface with the peptide.

Alternatively, contacting can occur in vivo, for example by administering the peptide to a subject afflicted with a bacterial infection or susceptible to infection. In vivo contacting is topical. "Inhibiting" or "Inhibiting effective amount" refers to the amount of peptide that is sufficient to cause, for example, a bacteriostatic or bactericidal effect. Bacteria that can be affected by the compositions of the present invention, containing LL-37 antimicrobial peptide, include both gram-negative and gram-positive bacteria. Infection with one or more bacteria can result in diseases such as bacteremia, pneumonia, meningitis, osteomyelitis, endocarditis, sinusitis, arthritis, urinary tract infections, tetanus, gangrene, colitis, acute gastroenteritis, impetigo, acne, acne posacue, wound infections, born infections, fascitis, bronchitis, and a variety of abscesses, nosocomial infections, and opportunistic infections. The method for inhibiting the growth of bacteria and biofilms of such bacterium can also include contacting the bacterium with the compositions of the present invention, containing LL-37 antimicrobial peptide, in combination with one or more antibiotics or other bacteriostatics (e.g., cathelicidins or amphipathic cationic peptides).

Commensal bacteria can modulate epithelial proinflammatory responses by releasing proteinases to cleave and inactivate cytokines in the guts. While not wishing to be bound by theory, it is believed that the compositions of the present invention, that contain LL-37, have the effect of up-regulating, or modifying, the proinflammatory response along a pathway that prevents or mitigates against the overproduction of Toll-like receptor (TLR) 3-dependent tumor necrosis factor-alpha (TNFα) by skin inhabitant *Staphylococcus epidermidis* and provides a Staphylococcal LTA and compositions thereof as TNFα inhibitor. Through TLR2 signaling pathway *Staphylococcus epidermidis* induced a negative regulator of TLR3, tumor necrosis factor receptor (TNFR)-associated factor 1 (TRAF1), whereas poly (I:C) triggered TLR3 to overexpress TIR domain-containing adapter inducing IFN-beta (TRIF) to recruit and activate caspase 8, resulting in the cleavage of TRAF1. The released N-terminal TRAF1 was required for turning off TLR3 signaling to limit the production of the proinflammatory cytokine TNFα. These disclosures demonstrate a critical pathway in skin that TLR2-TLR3 cross-talk controls TRAF1 against inflammations caused by viruses and bacteria and highlight the therapeutic potential of partially antagonizing the TLR3 pathway by *Staphylococcus epidermidis*.

Therefore, in another embodiment, the invention provides a method for inhibiting inflammation or an inflammatory disorder of the epidermis comprising contacting or applying a therapeutically effective amount of the compositions of the present invention, to the skin of a subject who has, or is at risk of having inflammation or a disorder.

In another aspect, the compositions of the present invention, containing LL-37 antimicrobial peptide, or functional variant, may be formulated for topical administration (e.g., as a lotion, cream, spray, gel, or ointment). Such topical formulations are useful in treating or inhibiting microbial, fungal, bacterial, viral presence or infections or inflammation on the eye, skin, and mucous membranes such as mouth, nasal-pharynx, intestine/rectum, vagina and the like. Examples of formulations in the market place include topical lotions, creams, soaps, wipes, and the like. It may be formulated into liposomes to reduce toxicity or increase bioavailability. Other methods for delivery of the compositions of the present invention, can include oral methods that entail encapsulation of the compositions in microspheres or proteinoids, aerosol delivery (e.g., to the lungs), or transdermal delivery (e.g., by iontophoresis or transdermal electroporation). Other methods of administration will be known to those skilled in the art.

The term "inhibiting" means preventing or ameliorating a sign or symptoms of an infection or a disorder (e.g., a rash, sore, and the like). Examples of disease signs that can be ameliorated include an increase in a subject's blood level of TNF, fever, hypotension, neutropenia, leukopenia, thrombocytopenia, disseminated intravascular coagulation, adult respiratory distress syndrome, shock, and organ failure. Examples of subjects who can be treated in the disclosure include those at risk for, or those suffering from, a toxemia, such as endotoxemia resulting from a gram-negative bacterial infection, venom poisoning, or hepatic failure. Other examples include subjects having a dermatitis, a psoriasis as well as those having skin infections or injuries subject to infection with gram-positive or gram-negative bacteria, a virus, or a fungus. Examples of candidate subjects include those suffering from infection by *E. coli*, Hemophilus influenza B, *Neisseria meningitides*, staphylococci, or pneumococci. Other patients include those suffering from gunshot wounds, renal or hepatic failure, trauma, burns, immunocompromising infections (e.g., HIV infections), hematopoietic neoplasias, multiple myeloma, Castleman's disease or cardiac myxoma. Those skilled in the art of medicine can readily employ conventional criteria to identify appropriate subjects for treatment in accordance with the disclosure.

The term "therapeutically effective amount" as used herein for treatment of a subject afflicted with a disease or disorder means an amount of the compositions of the present invention, containing LL-37 antimicrobial peptide, or functional variant, sufficient to ameliorate a sign or symptom of the disease or disorder. For example, a therapeutically effective amount can be measured as the amount sufficient to decrease a subject's symptoms of dermatitis or rash by measuring the frequency of severity of skin sores.

Typically, the subject is treated with an amount to reduce a symptom of a disease or disorder by at least 50%, 90% or 100%. Generally, the optimal dosage of the polypeptide or peptide will depend upon the disorder and factors such as the weight of the subject, the type of bacteria, virus or fungal infection, the sex of the subject, and degree of symptoms. Nonetheless, suitable dosages can readily be determined by one skilled in the art. Typically, a suitable dosage is 0.5 to 40 mg peptide/kg body weight, e.g., 1 to 8 mg peptide/kg body weight.

A "viral killing amount" is an amount sufficient to achieve a virus-killing blood concentration or a viral-killing surface concentration in or on the patient or subject receiving the treatment If desired, a suitable therapy regime can combine administration of the compositions of the present invention, containing LL-37 antimicrobial peptide, or functional variant, with one or more additional therapeutic agents (e.g., an antibacterial peptide such as a cathelicidin polypeptide, an inhibitor of TNF, an antibiotic, and the like). The peptide(s), other therapeutic agents, and/or antibiotic(s) can be administered, simultaneously, but may also be administered sequentially. Suitable antibiotics include aminoglycosides (e.g., gentamicin), beta-lactams (e.g., penicillins and cephalosporins), quinolones (e.g., ciprofloxacin), and novobiocin. A combination therapy can comprise a composition of the present invention, and a cathelicidin polypeptide. Such a cathelicidin polypeptide can comprise the N-terminal cathelin-like fragment, or the C-terminal domain of cathelicidin can be co-administered or administered sequentially (see, e.g., U.S. Pat. No. 7,173,007, which is incorporated herein by reference in its entirety).

Cathelicidin proteins are composed of two distinct domains: an N-terminal "cathelin-like" or "prosequence" domain and the C-terminal domain of the mature AMP. The C-terminal domains of cathelicidins were among the earliest mammalian AMPs to show potent, rapid, and broad-spectrum killing activity. The term "cathelin-like" derives from the similarity of the N-terminal sequence with that of cathelin, a 12 kDa protein isolated from porcine neutrophils that shares similarity with the cystatin superfamily of cysteine protease inhibitors. The structure of the N-terminal 96-104 residue protein domain (the N-terminal cathelin-like domain) is believed to be stabilized by four cysteines engaged in two disulfide bonds. These four cysteines as well as their relative positions are well conserved in all species. The strict evolutionary conservation of this domain and its similarity to cystatins, a family of proteinase inhibitors, suggests it plays specific and independent biologic function in host defense.

The C-terminal 37 amino acids (or LL-37 peptide) of the mature AMP of human cationic antibacterial protein of 18 kDa (hCAP18) has been characterized. The LL-37 peptide was originally referred to as FALL39, named for the first 4 N-terminal amino acids (phe-ala-leu-leu) of this domain and the total number of residues (i.e., 39). LL-37 is a peptide predicted to contain an amphipathic alpha helix and lacks cysteine, making it different from all other previously isolated human peptide antibiotics of the defensin family, each of which contain 3 disulfide bridges. Antibacterial peptides from different mammals contained a conserved pro-region very similar to cathelin. Full length hCAP18 comprises the cathelin-like precursor protein and the C-terminal LL-37 peptide, thus comprising 170 amino acids.

Generally, the LL-37 peptide provides a method of increasing antibiotic activity by permeabilizing the bacterial outer membrane and combinations involving peptide and a sub-inhibitory amount (e.g., an amount lower than the bactericidal amount) of antibiotic can be administered.

Typically, the LL-37, or functional variant, and the antibiotic are administered within 48 hours of each other (e.g., 2-8 hours, or may be administered simultaneously).

A "bactericidal amount" is an amount sufficient to achieve a bacteria-killing blood concentration in the subject receiving the treatment.

The method for using the compositions of the present invention, containing LL-37 or a functional variant antimicrobial peptide, include the use of composition for treatment of viral skin disease, especially for the treatment of vaccinia and small pox infection. As the molecules are proteins, they are most well suited for topical application. However, peptide mimetics and other protein analogs with more favorable pharmacokinetic and pharmacodynamic properties can be developed for use with other routes of administration including, but not limited to, oral and parenteral.

The compositions of the present invention, can also be used in conjunction with vaccines to ameliorate or prevent eczema vaccination or after vaccination for the treatment of a skin condition. For example, Eczema Vaccinatum (EV) is one of the major complications of small pox vaccination and occurs in patients with a history of atopic dermatitis (AD), a Th2-mediated skin disease. Recently it was found that AD skin is deficient in its ability to express certain endogenous antimicrobial peptides, such as LL-37. This group of patients is known to be much more susceptible to serious complications of infection with vaccinia and related viruses. Vaccinia virus is used for small pox vaccination.

The compositions of the present invention provide a method for inhibiting the spread or infection of a virus, such as corona virus by contacting the virus, or a surface upon which a virus may be present, with an inhibiting effective amount of the composition. The term "contacting" in this context refers to exposing the virus to a cationic antiviral peptide so that the peptide can inhibit the spread of infectivity of a virus or kill the virus itself. For example, by adding the composition to a culture comprising a virus (e.g., vaccinia virus) one can measure the susceptibility of a culture to the infectivity of a virus in the presence of the composition. Alternatively, contacting can occur in vivo, for example, by administering the composition to a subject that is susceptible to or afflicted with a viral infection. The administration includes topical as well as parenteral. "Inhibiting" or "inhibiting effective amount" in this context refers to the amount of LL-37 peptide contained within the composition that is sufficient to cause a viral inhibition or kill a virus. Examples of viruses that can be inhibited include herpesviridae (herpes simplex virus (HSV), varicella-zoster virus), vaccinia virus, Pappiloma virus and other viruses causing skin diseases. The method for inhibiting the viral infection can also include the contacting of a virus with the composition alone or in combination with one or more other antiviral agents.

The compositions of the present invention, containing the LL-37 antimicrobial peptide, are also useful as a broad-spectrum antimicrobial suitable for tackling the growing problem of antibiotic-resistant bacteria strains, and for treating and/or preventing outbreaks of infectious diseases, including diseases caused by bioterrorism agents like anthrax, plague, cholera, gastroenteritis, multidrug-resistant tuberculosis (MDR TB). The compositions and therapy kits containing the compositions can be used therapeutically and prophylactically for biodefense against new bio-attacks. For example, one could develop kits containing formulations comprising the composition alone or in combination with cathlicidins or other antimicrobial agents. The kits can be provided, for example, to a population subject to bioterrorist attacks (e.g. the military).

As a model to study the potential in vivo significance of the compositions of the present invention, CRAMP Cnlp knockout mice known to lack expression of CRAMP, a close murine ortholog of cathelicidin human LL-37, can be used. Importantly these mice generated a significantly greater number of pox skin lesions than seen in wild type isogenic control mice. Accordingly, one can screen the biological activity of a variant of LL-37 in the composition using the CRAMP knockout susceptible mice. These in vitro and in vivo observations suggest that the increased susceptibility of atopic dermatitis patients to eczema vaccinatum may be due to a deficiency of cathelicidin. Such knockout mice are effective models to test the therapeutic effects of the compositions.

In one aspect, the invention provides a method of screening for biologically active antimicrobial compositions comprising LL-37 or functional variant by contacting a culture comprising a *Staphylococcus* or group A *Streptococcus* with the compositions and determine the effect the agent has on bacterial growth or the effect on bacterial killing. In another aspect, an in vivo model can be used comprising generating an infection on a CRAMP knockout mouse and detecting the ability of the composition to reduce the infection or symptoms of the infection following contacting the infected mouse with the composition.

As discussed above, *S. epidermidis* (Se) is a major component of the skin flora and can Inhibit bacterial growth on the skin. It is believed that the LL-37 antimicrobial peptide plays a vital role in upregulating the function of Se. The following protocol offers an ideal model in which the upregulation properties of LL-37 could be further investigated and closely observed if the *S. epidermidis* delta-haemolysin antimicrobial peptide were to be replaced with an LL-37 antimicrobial peptide. Previous reports of *S. epidermidis* delta-haemolysin suggest that the peptide plays a role in quorum sensing and bacterial growth regulation at the genetic level. In addition, other studies have reported that delta-hemolysin from *S. aureus*, a peptide similar to that produced by *S. epidermidis*, interacts with lipid membranes of the bacterial cell wall. To assess how delta-haemolysin and PSMdelta function as antimicrobial peptides, their physical properties were investigated.

Tryptophan emission is a sensitive indicator for the physical environment surrounding the amino acid (330 nm in a folded or hydrophobic environment; "355 nm in an unfolded or aqueous environment). The tryptophan in delta-haemolysin showed only partial exposure to the aqueous environment in buffer alone, suggesting that the peptides aggregate. The peptides were dissociated or unfolded from their complexes using increasing concentrations of urea. Increasing peptide concentration (5 to 25 μM) shifted the unfolding curve such that higher concentrations of urea were required to disassemble the peptide complexes. The midpoints of the unfolding curves of 5 μM and 25 μM were 2.14 and 3.20M urea and yielded deltaG$^1$ (H$_2$O) values of 1.43 and 1.57 kcal/mol, respectively. These data indicate that increasing the concentration (number of peptides) increases the deltaG$^1$ (H$_2$O) and thus, the stability of multimeric peptide complexes. Furthermore, upon delta-haemolysin incubation with lipid vesicles, the tryptophan emission blue shifts from 339 nm to 332 nm, suggesting that the peptides associate with the membrane. Interestingly, urea is unable to dissociate the peptide from the vesicle, as the tryptophan only slightly red shifts from 332 nm to 335 nm. Thus, delta-haemolysin forms multimeric peptide complexes and strongly interacts with membranes.

Both delta-haemolysin and PSMdelta were evaluated for their ability to perforate synthetic lipid vesicles. Lipid vesicles were made with a 2:1 molar ratio of POPC to POPG. The lipid vesicles, extruded through a 200 nm polycarbonate film, encapsulated the fluorescent dye, ANTS, and a quencher: DPX. Upon membrane perforation, ANTS/DPX are released and separated, allowing ANTS to fluoresce at 530 nm. Dose-dependent fluorescence was observed when delta-haemolysin and PSMdelta were incubated with lipid vesicles for 1 hour. In addition, SEM analysis of GAS treated with delta-haemolysin showed membrane blebbing and disruption, similar to GAS treated with CRAMP. These data indicate that the peptides function similar to innate antimicrobials of the skin, disrupting and lysing target membranes.

These observations show that *S. epidermidis* competes with and prevents growth of skin pathogens. The data also show that the peptides can cause membrane leakage and are toxic. Despite this relative toxicity, *S. epidermidis* harmlessly and ubiquitously resides on the skin's surface and is unable to invade tissue unabated, which suggests that the bacterium has a non-pathogenic tendency. In addition, the layer of cornified epithelium likely renders the skin impenetrable to the antimicrobial peptides produced by *S. epidermidis*, making the peptides a defense against pathogenic invaders such as GAS and *S. aureus*.

While *S. epidermidis* protects the skin from infections, the skin affords the bacterium an ecological niche conducive to growth and survival. Healthy skin, unlike burned-skin, supports survival and growth of the bacterium, illustrating that *S. epidermidis* benefits directly from the cutaneous niche. The reciprocated benefit derived from the colonization of *S. epidermidis* on the skin classifies this bacterium as a mutual symbiote, rather than a commensal. Thus, *S. epidermidis* and other cutaneous microbiota play a vital role in directly promoting host health, and indirectly influencing the epidermal cells. The positive benefits of these microbes and their products indicate not only their inclusion in the host innate immune system, but also their position as the first line of defense against invading pathogens.

It must be noted that as used herein and in the appended claims, the singular forms 2 "an", and "the" include plural reference unless the context clearly dictates otherwise. The phrases "formula", "formulation", 'composition ", and "ingredients" are to be used interchangeably and such use depends on the context.

The phrase "antibacterial" means, but is not limited to, gentamicin, kanamycin and streptomycin, penicillin, ampicillin and imipenem; cephalosporin, macrolide; oxazolidinone; tetracycline; glycopeptide; and ansamycin.

The phrase "antifungal" means, but is not limited to, azoles; macrocycles; echinocandins; polygodial; ciclopirox; tolnafate; benzoic acid; and flucytosine.

The phrase "anti-inflammatory" means, but is not limited to, a steroidal anti-inflammatory, such as hydrocortisone; fluocinolone acetonide; halcinonide; halobetasol propionate; clobetasol propionate; betamethasone dipropionate; betamethasone valerate, triamcinolone acetonide; and mixtures thereof; or a non-steroidal anti-inflammatory (NSAID) such as salicylic acid derivatives (aspirin, sodium salicylate, chlorine magnesium salicylate, salsalate, diflunisal, salicylsalicylic acid, sulfasalazine, and olsalazine; para-aminophenol derivatives (acetominophine); indole and indene acetic acid (indomethacin, sulindac, etodolac); heteroaryl acetic acids (tolmetin, diclofenac and ketorolac); arylpropinoic acids (ibuprofen, naproxen, flurbiprofen, ketoprofn, fenoprofen and oxaprozin); anthranilic acids or fenamates such as oxicams, metoxicam, piroxicam and tenoxicam; pyrazolidineones (phenylbutazone, oxyphenthatrazone); alkanones (nabumetone); apazone (azapropazone); nimesulide; and mixtures thereof.

The phrase "antimicrobial" means, but is not limited to, a compound having the ability to kill or inhibit the growth of a microorganism. There are essentially two types of antimicrobials. The first type (microbicidal) is lethal and offers complete microbial cell destruction or incapacitation, whereas the second type (microbiostatic) only offers reversible microbial cell damage such that if the organism becomes free of the agent, it can again multiply, those used in conjunction with the compositions of the invention include both types, selected from, but not limited to, triclosan, metronidazole, tetracyclines, quinolones, plant essential oils, camphor, thymol, carvacrol, menthol, eucalyptol, methyl salicylate, tobramycin, cetylpyridinium chloride, neomycin, polymyxin, bacitracin, clindamycin, ciprofloxacin, rifampin, oxfloxacin, macrolides, pencillins, cephalosporins, amoxicillin, quinupristin, fluroquinolones, ketolides, aminoglycosides and mixtures thereof.

The phrase "antiparasitic" means, but is not limited to, benzazoles, such as albendazole, mebendazole, tiabenzadole; azoles, such as metronidazole and tinidazole; macrocycles, such as amphotericin B, and ivermectin; pyrantel pamoate; diethylcarbamazine, niclosamide; melarsopro; and eflorithine.

The phrase "antiviral" means, but is not limited to, a nucleoside analog reverse transcriptase inhibitor, such as acyclovir, didanosine, stavudine, lamivudine, abacavir, emtricitabine, entecavir, uncoating inhibitors such as amantadine, rimantadine and pleconaril; protease inhibitors such as saquinavir, ritonavir, indinavir; zanamivir, oseltamivir; and rifampin.

The phrase "antiseptic" means a substance that kills and prevents growth and reproduction of bacteria, protozoa, yeast, fungi, and viruses, including, but not limited to, biguanides (alexidine, chlorohexidine, polyhexamethylbiguanide); dyes (methyl violet, methylene blue, genetain violet), metal ion salts or conjugates (silver, silver oxide, silver sulfadiazone, zinc, copper, bismuth, gallium and iodine); phenolics (chloroxylenol, hexachlorophene, iodophene, triclosan, and thymol); quaternary ammonium compounds (benzalkonium chloride, cetalkonium chloride, cetrimonium, cetrimide, didecyldimethylammonium chloride; dofanium chloride; domiphen bromide, methylbenzethonium chloride; tetraethylammonium bromide; and dimethyloctadecyl ammonium chloride. The phrase is sometimes used synonymously with "antimicrobial," which is not how it is used here. Also antiseptics and antimicrobials should be distinguished from antibiotics, which also kill bacteria.

The phrase "bacteria" means, but is not limited to, both gram-negative and gram-positive bacteria (and their respective strains) such as, *Staphylococcus, Streptococcus; Enterococcus*; Cocci such as, *Neisseria gonorrhoeae, Neisseria meningitides, Branhamella catarrhalis; Bacillus; Beggiatra; Brevibacterium; Burkholderia cepacia; Propionbacterium acnes; Corynebacterium; Listeria monocytogenes; Clostridium; Escherichia coli; Enteobacter* species; *Proteus mirablis; Pseudonomas aeruginosa, Klebsiella pneumonia, Salmonella; Shigella; Serratia; Desulfovibrio, Flavobacterium; Gallionella; Klebsiella; Leptothrix; Pseudomonas; Proteus; Sarcina; Xanthomonas*; and *Thiobacillus*.

The term "biofilm" means a mucilaginous community of an extracellular matrix or a biological conglomerate of microorganisms, microbes or pathogens (e.g. gram positive and gram negative bacteria, archaca, fungi, molds, parasites, viruses, algae, protozoa or mixtures thereof) embedded in an extracellular matrix of exopolymers and macromolecules, that grow on various surfaces when the microorganisms establish themselves on a surface and activate genes involved in producing a matrix that made of polysaccharides. The biofilm acts as a binding agent that surrounds a population of microorganisms. Most often the biofilm exists on the surface in contact with water which provides for a hydrated matrix of polysaccharides that offers increased structural protection for the matrix.

The phrase "contacting" means where the compositions, used in the present invention, are introduced via test tube, flask, tissue culture, chip, array, plate, capillary, swab, wipe, or any other mode of physical interaction.

The phrase "disease" means, but is not limited to, middle ear infections, osteomyelitis, prostatitis, colitis, vaginitis, urethritis, arterial plaques, Covid-19, synovial infections, tissue fascia infections, respiratory tract infections, genitourinary tract infections (such as urinary tract infections), gastric ulcers, duodenal ulcer infections, bacteremia, pneumonia, meningitis, osteomyelitis, endocarditis, arthritis, urinary tract infections, tetanus, gangrene, acne, fasciitis, abscesses and nosocomial infections.

The phrase "surfactant" means, but is not limited to, skin compatible anionic and non-anionic surfactants such as, organocarboxylic acids (caproic, capric, and caprylic acid), sulfonates (alkylsulfonate, diphenylated sulfonates); sulfonated acids (alkyl benzene sulfonic acid, sulfonated oleic acid), sulfates (sulfated alcohols, sulfated alcohol ethoxylates, sulfated alkylphenols, alkyl sulfates, sulfosuccinates, alkylether sulfates, alkyl ethoxysulfates, fatty oleyl glycerol sulfates and alkyl phenol ethylene oxide ether sulfates); and mixtures thereof.

The phrase "therapeutically effective amount" means the concentration or quantity or level of the composition of the invention that can attain a particular medical end in preventing, disrupting or eliminating biofilms or otherwise having toxic activity for biofilms.

The phrase "topical" or "topical administration" mean administration that is appropriate for skin or skin surface applications which includes, but is not limited to, wipes, sprays, foams and suppositories, along with transdermal administration (ointments, salves, gels, patches, or creams).

The phrase "treating" means, but are not limited to, "reducing", "suppressing", "inhibiting", "lessening", "modulating", and "decreasing".

EXAMPLES

Examples 1 to 8 document and relate to the prior art aspects of the compositions and methods of the present invention used for antiseptic skin cleansing and maintenance treatment for patients suffering from skin infections.

Examples 9 to 10 represent compositions and methods of the present invention where the "therapeutic hybrid benefit" of using the compositions and methods are demonstrated. The hybrid benefit involves treating antimicrobials and biofilms on the surface of mammalian tissue, especially those that occur in association with chronic wounds and burns, while simultaneously providing for the antiseptic cleansing and maintenance of the stratum corneum of the tissue and other tissue surfaces, and an opportunity for the tissue to improve by engaging its own natural barrier and immunological defense properties. By way of comparison, unlike cholorohexadrine and alcohol, the compositions of the present invention have no restrictions on their application to the face, mucus membranes, the meatus, or perineal and rectal areas, and may be used as frequently as deemed necessary. The compositions of the present invention exhibit a broad-spectrum anti-microbial activity, while simultaneously nourishing and moisturizing the skin, maintaining the natural pH of the skin's mantel, supporting the stratum corneum so that barrier function is preserved even as the skin is decolonized from infectious agents and maintaining the skins ability to engage its own immunological defense properties. Prolonged antimicrobial activity is demonstrated up to about three hours. It should be noted that odors are also one indication of infection and that practice of the method of the invention reduces or eliminates odors associated with CAUTI's. The mode of bacterial cellular death is believed to be disruption of cell membranes with the resultant loss of cytoplasmic contents and yet without damage to skin or living tissues. The three substances that are believed to contribute the most are: citrus-based antimicrobial stabilizers, zwitterionic surfactants with quaternary ammonium cations, and the colloidal silver. Compositions of the present invention containing vitamin E, aloe vera, allantoin, colloidal silver, and beta glucan, and is said to be greater than 99.9% effective against gram negative and gram positive bacteria.

Example 1 (Prior Art)

(THERAWORX ® Antiseptic Skin Cleansing Solution)

| Category | Ingredient | Wt. % |
| --- | --- | --- |
| (a) | Aloe vera | 1-7 |
| (b) | Allantoin | 0.2-1 |
| (c) | Cocamidolpropyl Betain | 0.2-2 |
| (d) | Lauryl Glucoside | 0.1-2 |
| (e) | Dimethicone Copolyol | 0.1-2 |
| (f) | Citricidal ® | 0.4-2 |
| (g) | Collodial silver | 0.2-4 |
| (h) | Beta glucan | 0.1-6 |
| (i) | Methylparaben | 0.1-2 |
| (j) | Propylparaben | 0.1-2 |
| (k) | EDTA | 0.01-0.1 |
|  | Fragrances | 0.02-1 |
|  | Vitamin E | 0.01-2 |

Example 2 (Prior Art)

(THERAWORX®) Antiseptic Skin Treatment)
Antimicrobial Efficacy

A commercial laboratory tested a THERAWORX® brand solution for antimicrobial effectiveness using a procedure to determine a five-year real-time aged sample. Five challenge microorganisms were used, including *Escherichia coli, Pseudomonas aeruginosa, Staphylococcus aureus, Candida albicans*, and *Aspergillus brasiliensis*. 8 mL of sample Theraworx brand solution were aseptically transferred to sterile tubes for each challenge microorganism. The 8 mL portions were inoculated with 0.1 mL of the respective challenge microorganism and were mixed thoroughly, so that the final concentrations of the test organisms per mL were $1.0 \times 10^5$ to $1.0 \times 10^6$ colony forming units (CFU). The inoculated samples were stored in sterile test tubes to prevent desiccation and were incubated at 20 to 25° C. Plate counts were performed for each inoculation formulation at Days 7 and 14 with a 14 day re-challenge incorporated into the test. Plate counts were repeated at Day 7, 14, and 28 of the re-challenge. At each assay interval 0.1 mL of the sample was directly plated. 0.1 mL of each sample were transferred to a sterile tube along with 9.9 mL of sterile lactobacilli agar (AOAC). The individual tubes were vortexed thoroughly for 30 seconds and serial dilutions of the extract were plated (via pour plate methodology) with tempered/molten tryptone soya agar (TSA) or sabouraud dextrose agar (SDA) containing neutralizers (0.1 Tween 80 & 0.05% Lecithin). The plates were incubated at 30 to 35° C. for 72 hours for bacteria and 20 to 25° C. for 5 to 7 days for fungus.

The results of the test indicated a log reduction of 4.28-5.00 for the bacterial and fungal test microorganisms by Day 7 of the initial test for the S-year real-time aged samples. There was no increase in the level of microorganisms seen for the remainder of the 28 day re-challenge test, with the exception of *Pseudomonas aeruginosa*. At the 28 day re-challenge test all organisms exhibited a 99.99% reduction except *Pseudomonas aeruginosa*, which exhibited a 99.98% reduction, still a very significant reduction.

ASTM E640-06 Standard Test Method for Preservatives in Water-Containing Cosmetics with a 56 day re-challenge was used to test the effectiveness of preservatives in the THERAWORX® solution in the following organisms: Methicillin resistant *Staphylococcus aureus, Escherichia coli, Candid albicans, Aspergillus niger, Pseudomonas aeruginosa*, and *Staphylococcus aureus*. The substrate used was Vitro-Skin® an advanced testing substrate that effectively mimics the surface properties of human skin. It has been formulated to have topography, pH, critical surface tension, and ionic strength similar to human skin. The results of the testing showed that initial inoculations and re-inoculations ranged from $>10^7$ organisms to $>10^9$ organisms. The preservative in THERAWORX® reduced bacterial counts by $10^5$ in all organisms and maintained this level of protection throughout the 56 day test regimen even with bacterial re-exposure. Exact kill rates may be even higher as culture plates exhibited no growth after exposure to the solution.

The antibacterial properties of THERAWORX® antiseptic solution has been tested against Vancomycin resistant *Enterococcus faecalis* (VRE). The THERAWORX® solution demonstrated a >99.99% (>4.80 $\log_{10}$) reduction of VRE following a 15-minute exposure time when tested at an ambient temperature of 20.9° C.

The THERAWORX® antiseptic solution was tested for antibacterial effectiveness against *Klebsiella pneumonia* carbapenem resistant bacterium following a 15-minute exposure and a 99.2% reduction (2.08 $\log_{10}$) following a 1-hour exposure time, when in the presence of a 5% bovine serum organic soil load and tested at ambient temperature of 20.7° C. Under identical conditions THERAWORX® was also tested against *Escherichia coli* carbapenem resistant bacterium and demonstrated a >99.9% reduction (3.84 $\log_{10}$) following a 15-minute exposure and a 99.99% reduction (4.01 $\log_{10}$) following a 1-hour exposure time.

The THERAWORX® antiseptic solution was also tested for its duration of action in terms of its antimicrobial performance against Methicillin resistant *Staphylococcus aureus* (MRSA) using a collagen-based inoculation model. Bovine collagen was prepared and divided into three groups: control (normal saline), alcohol-based skin cleanser, and the THERAWORX® solution. The collagen was placed in the assigned solution and allowed to saturate for five minutes. All specimens were then removed and allowed to air dry for five minutes on sterile paper with each specimen being turned over to facilitate even air drying at the 2.5-minute mark. After drying they were placed in a sterile lidded specimen container. At designated intervals of 15 minutes, 30 minutes, 60 minutes, 120 minutes, and 180 minutes, ten samples from each group were subjected to inoculation using 106 MRSA followed by incubation for 24 hours. Punch biopsies were then performed from the center of each specimen and quantitative cultures performed. The results indicated that at all time intervals in both the control and alcohol-based skin cleanser that the MRSA were too numerous to count and appeared to have spread to cover nearly the entire specimen container. However, the results also showed that THERAWORX® was effective >99.99% at all time intervals.

In junction with the Texas Biomedical Research Institute ("TBRI"), a biosafety level 4 laboratory registered with the Department of Health and Human Services CDC Select Agent Program, a THERAWORX® antiseptic solution was tested against Ebola, an envelope virus. In the first experiment Vitro-Skin® test substrate was inoculated with a metered dose of the Zaire ebolavirus (EBOV) and the samples were incubated for 5 minutes. The substrate was then wiped with a cloth saturated with THERAWORX® and allowed to incubate for five additional minutes. Thereafter, the substrate was cultured with a growth medium-saturated swab to detect infectivity in the host cells. The results showed no infectivity after wiping. It is assumed that the mechanical action of wiping combined with the known anti-viral activity of THERAWORX" was sufficient to remove or inactivate the virus.

A second experiment was conducted to evaluate the effectiveness of THERAWORX® alone, without wiping, against EBOV. Again, EBOV was applied to the test substrate, followed by a S-minute incubation. The substrate's surface was sprayed with THERAWORX® until saturated. After an additional 5-minute incubation period, the surface was cultured and evaluated for infectivity. The results were present as viral plaque-forming units per milliliter (PFU/ml), indicating level of infectivity. When compared to untreated samples, the THERAWORX® spray treated samples showed a reduction of infectivity of 99.85%.

Example 3 (Prior Art)

(THERAWORX® Antiseptic Skin Treatment)
In Vitro and In Vivo Compatibility

THERAWORX® antiseptic solution was tested for in vitro and in vivo biocompatibility using the ISO Intracutaneous Reactivity Test, the ISO Acute Systemic Injection Test, the ISO Guinea Pig Maximization Sensitization Test, and for cytotoxicity the MEM-Elution using L-929 Mouse Fibroblast Cells (ISO). These tests demonstrated the safe use of THERAWORX® in contact with breached or otherwise compromised skin. THERAWORX® is considered non-toxic and non-irritating to the skin and tissues and not to elicit a sensitization response. Additionally, no potential toxic effects as a result of a single-does systemic injection were observed.

Based on the above results, multiple hospitals, health care facilities and sports organizations are performing internal studies to determine if THERAWORX® should be used at their locations for decolonization, prevention of bacterial contamination of urine cultures, efficacy of THERAWORX® in bath wipes for the reduction of skin colonization with VRE in children undergoing hematopoietic stem cell transplantation, perineum decolonization in high-infection rate pre-term premature rupture of membranes ("PPROM") among pregnant women at risk for this condition, and urine and fecal urinary tract infections not due to a catheter.

Example 4 (Prior Art)

(THERAWORX® Antiseptic Skin Treatment)
Military Field Application

United States military forces in South Korea tested the product as a field treatment. Using the MacNab criteria, the results were evaluated and rated by the troops as: (1)—poor, no perceived effect; (2)—fair, some perceived positive effect; (3)—good, noticeable perceived positive effect; and (4)—excellent, significant perceived positive effect. Twenty-six (26) respondents evaluated the product in four areas: sanitation; scrapes, cuts, and burns; fungus, jock itch, athlete's foot; and muscle discomfort. More than 80% of respondents rated the field treatment as good with noticeable perceived positive effects in relation to sanitation and to scrapes, cuts, and burns.

The Macnab criteria is a well-established and documented tool used in clinical research and discovery when evaluating the effectiveness on pain of prescription drugs and medical devices. The Macnab criteria provide a results-based assessment of the patient's response to treatment, and in particular, the patient's experience of efficacy or not, apart from the mechanism of action of the drug or device.

Seventy-nine percent of respondents also rated the field treatment as good, with noticeable perceived positive effects, in relation to fungus, jock itch, and athlete's foot. A majority of respondents also rated the field treatment as good, with a noticeable positive perceived effect on muscle discomfort, 63%. When the respondents were asked whether they would use the product again, 92.3% replied "yes." Additional results are listed in the table below:

TABLE 1

|  | 2+ | 4 | 3 | 3+ |
| --- | --- | --- | --- | --- |
| Sanitation | 46% | 42% | 88% | 96% |
| Scrapes, Cuts, Burns | 52% | 30% | 83% | 100% |
| Fungus(Jock Itch/Athletes Foot) | 53% | 26% | 79% | 95% |
| Muscle Discomfort | 42% | 21% | 63% | 84% |

Example 5 (Prior Art)

(THERAWORX® Antiseptic Skin Treatment)

A trial, using the Theraworx solution, was conducted at five intensive care units at Baptist Hospital, a 383-bed facility in Lexington, Kentucky. The purpose of the hospital study was to determine whether the use of a colloidal silver impregnated wipe and foam cleanser, which was the THERAWORX® solution when used as part of a cleansing protocol within the current Foley catheter care protocol practiced by the hospital would be efficacious in reducing the incidence of CAUTI's in the intensive care setting.

Mean infection rates in the five ICU's in 2012 ranged from 1.2 infections per 1000 device days to 5.9 infections per 1000 device days. The hospital performed the steps of the protocol starting in April 2013, including cleansing the perineum with THERAWORX" prior to insertion and allowing the solution to dry in air for 30 seconds, opening the sterile Foley catheter and cleansing the Foley catheter with THERAWORX", wiping the meatus with Betadine®, and inserting the catheter using the accepted aseptic techniques. The meatus, perineum, and exposed portions of the catheter were again cleansed with THERAWORX" after insertion. THERAWORX® soaked cloths were used two to three times daily for maintenance wiping and additional wiping was done as a final cleansing for incontinence. As a result, zero CAUTI's were reported in four out of five ICU's by the second month of the study and by the fourth month all five ICU's had reduced their CAUTI infections to zero infections per 1,000 device. Although some units had achieved zero CAUTI infection rates prior to the start of the study, it was only after the study was initiated that all five intensive care units maintained a zero CAUTI infection rate for the same month. These results exceeded the 2012 mean CAUTI rates and were below the National Healthcare Safety Network CAUTI benchmark of 1.4 infections per 1,000 device days.

Table 1, below, summarizes the results of the hospital study from June 2013 through July 2013 and includes the rates of CAUTI's of each of the five ICU's from January 2013 through July 2013 and the 2012 mean rate of CAUTI's in each of the five ICU's. The corresponding results are illustrated graphically in FIG. 3.

risk factors associated with CAUTIs, and (b) nurse behaviors related to care of Foley catheters. Data were collected for each patient for a period of 1 to 10 days depending on length of stay. Descriptive statistics were calculated in order to evaluate potential risk factors for CAUTI's, including age, gender, weight, stool incontinence, and related nursing practices among patients in critical care.

It should be recognized that sometimes an ICU held few catheterized patients and that multiple variables can impact CAUTI rate, including staff compliance with established protocol. For example, where there are few catheterized patients in the ICU, the CAUTI rate may fall to zero. However, overall, the impact of the protocol of the method of the invention is clearly demonstrated to reduce CAUTI rates and to increase compliance with the new protocol as compared to established protocol.

In order to evaluate nursing practice of Foley care, the following questions were asked of the nurses: 1) was the THERAWORX® solution used to clean the perineum? 2) was THERAWORX® solution used to clean the Foley catheter? 3) were the components of the catheter accurately attached? and 4) was the Foley catheter accurately placed? The information relating to nursing practice of Foley care is summarized below in Table 2. The letter "n" refers to the number of device indwelling days.

TABLE 1

|  | 2012 Mean | Jan. | Feb. | Mar. | Apr. | May | Jun. | Jul. |
|---|---|---|---|---|---|---|---|---|
| 2ICU CAUTI Rate (per 1,000 device days) | 2.3 | 5.6 | 0 | 11.2 | 6.8 | 6.6 | 0 | 0 |
| 3IN CAUTI Rate (per 1,000 device days) | 1.2 | 0 | 0 | 0 | 0 | 0 | 0 | 0 |
| 3IS CAUTI Rate (per 1,000 device days) | 4.7 | 0 | 9.8 | 0 | 0 | 0 | 0 | 0 |
| 4IN CAUTI Rate (per 1,000 device days) | 5.9 | 13.5 | 0 | 0 | 0 | 0 | 0 | 0 |
| 4IS CAUTI Rate (per 1,000 device days) | 0.9 | 0 | 0 | 0 | 0 | 0 | 0 | 0 |
| NHSN CAUTI Benchmark | 1.3 | 1.4 | 1.4 | 1.4 | 1.4 | 1.4 | 1.4 | 1.4 |

The hospital report also details information collected on the 1,282 patients over a three month period related to: (a)

| Day in Hospital | THERAWORX ® used to cleanse Perineum Yes(n) | THERAWORX ® used to cleanse Foley Yes (n) | Accurate attachment of the device Yes(n) | Accurate placement of the Foley Yes(n) |
|---|---|---|---|---|
| 1 | 99.1% (1,099) | 99.8% (1,238) | 99.4% (1,238) | 99.8% (1,241) |
| 2 | 98.8% (811) | 100.0% (872) | 99.9% (874) | 99.9% (869) |
| 3 | 99.7% (385) | 99.8% (421) | 99.8% (422) | 100.0% (422) |
| 4 | 97.8% (223) | 99.6% (241) | 99.2% (241) | 100.0% (241) |
| 5 | 100.0% (113) | 100.0% (121) | 100.0% (120) | 100.0% (120) |
| 6 | 100.0% (56) | 100.0% (59) | 100.0% (59) | 100.0% (59) |
| 7 | 100.0% (15) | 100.0% (15) | 100.0% (15) | 100.0% (15) |
| 8 | 100.0% (5) | 100.0% (5) | 100.0% (5) | 100.0% (5) |
| 9 | 100.0% (3) | 100.0% (3) | 100.0% (3) | 100.0% (3) |
| 10 | no data | no data | no data | no data |

Example 6 (Prior Art)

(THERAWORX® Antiseptic Skin Treatment)

John Muir Medical Center in Walnut Creek, California, undertook a study as a quality improvement project in its emergency department, the study undertaken from April 2013 to Jul. 10, 2014, to evaluate the impact of a THERAWORX" antiseptic solution used in protocols for urinary catheter insertion and maintenance for CAUTI prevention in hospitalized patients. CAUTI's were defined according to the definitions of the Centers for Disease Control and Prevention National Heathcare Safety Network. The John Muir study specifically refers to the Prevention Guidelines of the Healthcare Infection Control Practices Advisory Committee (HICPAC) and to Gould C. V., Umscheid C. A., Agarwal R. K., et al.

The "Guideline for Prevention of Catheter-Associated Urinary Tract Infections 2009,' which was accessed by John Muir Medical Center in 2014, recommends, in contrast to the method of the invention studied at John Muir and the subject matter of the invention described herein, that antiseptic solutions not be used for routine catheter maintenance due to a lack of evidence to make an evidence-based decision. However, cleaning the periurethral area with antiseptics is recommended.

The John Muir Medical Center Study concluded that clear trends were evident shortly after use of the full THERAWORX® solution protocol was implemented that may show an effective CAUTI prevention intervention once fully implemented that is guideline concordant and fills critical gaps in knowledge.

The John Muir Medical Center protocol included using a cloth impregnated with a THERAWORX® antiseptic solution to wipe the perineum before Foley catheter insertion, concentrating on the entrance to the meatus, wiping front-to-back for women and in concentric circles around the glans penis for men. This first application was allowed to dry for thirty seconds and not rinsed off. Thereafter, the Foley catheter kit was opened, a Betadine® brand antiseptic swab was used to cleanse the urinary meatus area and the Foley catheter was inserted while practicing accepted sterile techniques. A new, second cloth was impregnated with a THERAWORX® antiseptic solution and used to wipe around the meatus and catheter in a downward direction for post-insertion catheter care, again wiping front-to-back for women and in concentric circles around the glans penis for men. Thereafter, new fresh wipes or a foam solution applied to a clean washcloth were used for routine catheter care and frequent perineum care every 8 to 12 hours, all in accordance with the invention, and for final cleaning after each incidence of incontinence or other contaminating event. In the event high risk factors were identified, then maintenance was increased to every four hours until the catheter was removed.

John Muir Medical Center reported that use of a THERAWORX® antiseptic solution impregnated cloths in connection with improvement in nursing staff behaviors drastically reduced the number of insertion-related CAUTI's, which are CAUTI's in which a UTI is not present on admission and a positive urine culture develops on or before the third day after insertion. In the four months after the improvements in quality were implemented, the number of documented emergency department related CAUTI went from 3 to less than 1.5 and costs dropped commensurately. In one month, the number of CAUTI's was zero, and no costs attributable to CAUTI were incurred.

Example 7 (Prior Art)

(THERAWORX® Antiseptic Skin Treatment)

First Health Moore Regional Hospital, a 395-bed facility, undertook a quality improvement project for catheter maintenance in all of its ICU's in August 2013 through October 2013 to practice the protocol of the invention. Prior to the study, in the third quarter of 2013, CAUTI rates in the ICU's were about 2.3% per 1,000 catheter days, or 4 CAUTI cases in 1,728 catheter days. These infections were determined to have occurred primarily after a catheter had been in place for more than 5 days and were expected to be due to catheter maintenance, not insertion. The hospital practiced the protocol of the invention, using an impregnated cloth, impregnated with a THERAWORX® antiseptic solution, for insertion and maintenance and at the end of October 2013, after 1,667 catheter days, had no CAUTI's and the protocol of the invention was approved for house-wide implementation for catheter insertion and maintenance, despite the current best practice recommended in the most recent literature of soap and water.

Example 8

(Antimicrobial and Biofilm Treatment Antiseptic Skin Cleansing Spray Composition)

| Category | Ingredient | Wt. % |
|---|---|---|
| | Cocamidopropyl Betain | 0.497 |
| | Dimethicone | 0.198 |
| | EDTA | 0.021 |
| | Cocamidopropyl Betain | 0.198 |
| | Lauryl Glucoside | 0.298 |
| | Vitamin E | 0.016 |
| | Diphenol Hydroxy Benzene (Citricidal ®) | 0.793 |
| | Collodial Silver | 0.397 |
| | Beta Glucan | 0.050 |
| | Aloe Vera | 1.987 |
| | Methyl Paraben | 0.198 |
| | Propyl Paraben | 0.100 |
| | Fragrance | 0.112 |
| | Water | 95.135 |

Example 9

(Method for Biofilm Disruption and Antiseptic Skin Treatment of Infected Chronic Wound Site)

The University of Florida Health, Institute For Wounds Research, in Florida and the University of North Carolina Health Center in North Carolina, undertook a collaborative study involving patients with chronic non-healing lower extremity wounds. The study was approved by the University of North Carolina human studies committee.

Clinical Trial Protocol: Ten (10) patients with wounds found to have chronic inflammation associated with biofilm bacterial colonization of the wound bed were enrolled in the trial. Ten patients with chronic non-healing lower extremity ulcers of were enrolled in the 4-week study. The patients suffered from different types of lower extremity wounds, such as diabetic foot ulcers, venous leg ulcers, and ulcers associated with chronic arterial insufficiency. A composition of the present invention represented the wound therapeutic used in the study. The composition is believed to work by reducing the pH of the skin and wound tissue (see FIG. 7) and thereby increasing their (i.e. the skin and wound tissue)

resistance to bacterial colonization associated with biofilm formation occurring in, and around, the wound and the skin involved in the wound area. Baseline patient demographics and wound characteristics were recorded. Next, samples of the wound fluid were obtained from each patient for characterization of the matrix metalloproteinase (MMP), an enzyme associated with biofilm formation, and to conduct a bacterial biofilm analysis of each patient's wound area.

A screening assay, using a fluorescent protein as a reporter, was employed for detecting the presence and/or activity of protease in sample of wound fluid in and around the patient's wound site. The assay used was a patented screening assay, described in U.S. Pat. No. 8,058,024 B2, which is hereby incorporated by reference. Protease is implicated in disparate pathologies including virulence factors that facilitate infections and infectious diseases. In vitro samples of the wound fluid were assayed for protease to determine the presence, quantity and concentration ratio of one or more proteases. The detection method used required a fluorophore dye and quencher dye to quickly determine and monitor the state of a wound by evaluating the protease presence and activity in and around the patients wound site. The assay technique employed is known as the FRET analysis, where a peptide of a sample substrate from the wound site is flurophore labeled using a fluorescing dye, a quencher dye in proximity to the fluorescing dye, and a protease cleavage site that sits between the dye and the quencher. The peptide cleavage site was MMP-9 and the incubation time of the proteolysis was around 10 minutes. The measurement involved attaching a fluorescing dye and a quenching dye to a sample substrate of the wound tissue. The dyes are placed in close proximity to each other on the substrate, so that the quencher dye quenches the fluorescence of the fluorescing dye at a site between the two dyes whenever the site is cleaved by the target protease. The sample is then subjected to non-ionizing electromagnetic radiation that cause only the fluorescing dye to fluoresce, wherein the detection of fluorescence represents a positive indication that protease is present in the sample.

Analysis: MMP activities were measured using a synthetic seven (7) amino acid peptide with a fluorochrome-quencher pair that generates a fluorescent signal when the peptide is cut by MMPs. Colony forming units (CFUs) of vial bacteria in biofilm phenotypes were measured by standard dilution plating technique following brief (10 minute) exposure of ultrasonically dispersed biofilm communities to dilute bleach (0.1%) followed by neutralization with 0.15% sodium metabisulfite. The patients were treated for four (4) weeks with the standard treatment for wound etiology plus application of the composition of the present invention to the wound and peri-wound areas at all dressing changes. At weekly visits wound characterizations were obtained and repeat wound fluid and tissue samples were obtained for MMP and bacterial analysis. At the completion of the 4 weeks of treatment wound size was re-measured to determine the percentage of wound healing over the 4 weeks of treatment.

Results: Nine (9) of the patients completed the 4-week treatment protocol. Of these patients six (6) healed at greater than 30% over the 4-week treatment phase. Mean area of wounds at baseline was 33.0 sq. cm and was reduced to 21.6 sq. cm after treatment with the composition of the present invention. The mean pH level as measured in the wound bed before antiseptic cleaning and debridement was 7.1 at baseline and 6.0 after 4 weeks, a 1.1 log reduction. At baseline, seven (7) out of ten (10) patients had significant detectable levels of biofilm activity with a mean activity of 1.217 CFU/ml of homogenate. After the 4-week treatment with the compositions of the present invention, only two (2) of the seven (7) had detectable levels of biofilm activity in wound samples with a mean activity of 5.7 CFU/ml of homogenate. At baseline the mean MMP-9 level was 8.9 plus or minus 8.1 relative fluorescence units RFU/min. After the 4 weeks of treatment with the composition of the present invention, the level decreased to 5.0 plus or minus 4.5 RFU/min. Treatment of the chronic non-healing wounds with the composition of the present invention resulted in a reduction in the incidence of significant biofilm wound involvement. Most patients' wounds, despite a lack of response to standard therapy prior to study enrollment, achieved a greater than 30% closure during 4 weeks of treatment with the composition of the present invention.

All of the methods disclosed and claimed herein can be made and executed without undue experimentation in light of the present disclosure. While the compositions and methods have been described in terms of preferred embodiments, it will be apparent to those of skill in the art that variations may be applied to the compositions and methods without departing from the concept, spirit and scope of the invention as defined by the appended claims.

Representative Formula for a ***
(THERAWORX ® PROTECT Bathing System Spray Formulation)

| Ingredient Category | Ingredient | Function | Wt. % |
|---|---|---|---|
|  | Aloe Barbadenis Leaf | Antioxidant | *** |
| (b) | Allantoin | Skin Protectant | *** |
| (a) | Cocamidolpropyl Betaine | Surfactant | *** |
| (h) | Lauryl Glucoside | Emulsifier | *** |
| (c) | PEG/PPG-4/12 Dimethicone | Refatting Properties | *** |
| (f) | Citricidal ® | Antimicrobial | *** |
| (f) | Collodial Silver | Antimicrobial | *** |
| (e) | Beta Glucan | Revitalize Skin | *** |
| (k) | Methylparaben | Preservative | *** |
| (k) | Propylparaben | Preservative | *** |
|  | Tetrasodium EDTA | Chelating Agent | *** |
|  | Fragrances | Fragrance | *** |
|  | Vitamin B | Antioxidant | *** |
| (h) | Glycerin | Moisturizer | *** |
|  | Water | Diluent | *** |

Example ***

(THERAWORX ® PROTECT 10X Surfactant Foam Formulation)

| Ingredient Category | Ingredient | Function | Wt. % |
|---|---|---|---|
|  | Aloe Barbadenis Leaf | Antioxidant | *** |
| (b) | Allantoin | Skin Protectant | *** |
| (a) | Cocamidolpropyl Betaine | Surfactant | *** |
| (h) | Lauryl Glucoside | Emulsifier | *** |
| (c) | PEG/PPG-4/12 Dimethicone | Refatting Properties | *** |
| (f) | Citricidal ® | Antimicrobial | *** |
| (f) | Collodial Silver | Antimicrobial | *** |
| (e) | Beta Glucan | Revitalize Skin | *** |
| (k) | Methylparaben | Preservative | *** |
| (k) | Propylparaben | Preservative | *** |
|  | Tetrasodium EDTA | Chelating Agent | *** |
|  | Fragrances | Fragrance | *** |
|  | Vitamin B | Antioxidant | *** |
| (h) | Glycerin | Moisturizer | *** |
|  | Water | Diluent | *** |

Example ***

(THERAWORX® PROTECT Joint Discomfort and Inflammation Formulation)

| Ingredient Category | Ingredient | Function | Wt. % |
|---|---|---|---|
| | Aloe Barbadenis Leaf | Antioxidant | *** |
| (b) | Allantoin | Skin Protectant | *** |
| (a) | Cocamidolpropyl Betaine | Surfactant | *** |
| (h) | Lauryl Glucoside | Emulsifier | *** |
| (c) | PEG/PPG-4/12 Dimethicone | Refatting Properties | *** |
| (f) | Citricidal ® | Antimicrobial | *** |
| (f) | Collodial Silver | Antimicrobial | *** |
| (e) | Beta Glucan | Revitalize Skin | *** |
| (k) | Methylparaben | Preservative | *** |
| (k) | Propylparaben | Preservative | *** |
| | Tetrasodium EDTA | Chelating Agent | *** |
| | Fragrances | Fragrance | *** |
| | Vitamin E | Antioxidant | *** |
| (h) | Glycerin | Moisturizer | *** |
| | Water | Diluent | |
| (l) | Yucca Schidigera | Plant Based Anti-Inflammatory | *** |
| (l) | Olibanum 8X | Plant Based Anti-Inflammatory | *** |
| (l) | Croton Lechleri Resin | Plant Based Anti-Inflammatory | *** |
| (l) | Agnus Castus Berry Extract | Plant Based Anti-Inflammatory | *** |
| (l) | Calcium Carbonate | Plant Based Anti-Inflammatory | *** |
| | Alcohol | Solvent | *** |

Example ***

(THERAWORX ® PROTECT Strong Surfactant Formulation)

| Ingredient Category | Ingredient | Function | Wt. % |
|---|---|---|---|
| | Water | | *** |
| | | Diluent | *** |
| (a) | Cocamidolpropyl Hydrosultaine | Surfactant | *** |
| | Aloe Barbadenis Leaf Extract | Antioxidant | *** |
| (f) | Silver Hydrosol | Antimicrobial | *** |
| | Tocopheryl Acetate | Antioxidant | *** |
| (b) | Allantoin | Skin Protectant | *** |
| | Yeast Extract | Skin Revitalizer | *** |
| (h) | Decyl Glucoside | Emulsifying | *** |
| | Tetrasodium EDTA | Chelating Agent | *** |
| (c) | PEG/PPG-4/12 Dimethicone | Refatting Properties | *** |
| (k) | Propyl Glycol | Preservative Diluent | *** |
| (k) | Diazolidinyl Urea | Preservative | *** |
| (k) | Methylparaben | Preservative | *** |
| (k) | Propylparaben | Preservative | *** |
| (h) | Ethylhexylglycerin | Diluent/Moisturizer | *** |
| (k) | Octendine HydroChloride | Preservative | *** |
| | Citric Acid | Buffer | *** |
| | Fragrances | Fragrance | *** |

Example ***

(THERAWORX ® PROTECT Peripheral Neuropathy Formulation)

| Ingredient Category | Ingredient | Function | Wt. % |
|---|---|---|---|
| | Water | Diluent | *** |
| (a) | Cocamidolpropyl Hydrosultaine | Surfactant | *** |
| (l) | Zingiber Officinate Ginger Extract | Plant Based Anti-Inflammatory | *** |
| (h) | Glycerin | Moisturizer | *** |
| (h) | Fructooligosaccharides | Moisturizer/Soothing | *** |
| (h) | Beta Vulgaris Root Extract | Moisturizer/Soothing | *** |
| (a) | Phragmites Communis Extract | Anti-Inflammatory | *** |
| (a) | Poria Cocos Extract | Anti-Inflammatory | *** |
| | Aloe Barbadenis Leaf Extract | Revitalizer for Skin | *** |
| (h) | Yeast Extract | Moisturizer | *** |
| (f) | Silver Hydrosol | Antimicrobial | *** |
| | Tocopheryl Acetate | Antioxidant | *** |
| (b) | Allantoin | Skin Protectant | *** |
| (h) | Decyl Glucoside | Emulsifying | *** |
| | Propylene Glycol | Diluent | *** |
| (k) | Diazolidinyl Urea | Preservative | *** |
| (k) | Methylparaben | Preservative | *** |
| (k) | Propylparaben | Preservative | *** |
| | Tetrasodium EDTA | Chelating Agent | *** |
| (c) | PEG/PPG-4/12 Dimethicone | Refatting Properties | *** |
| | Citric Acid | Buffer | *** |
| (c) | Simethicone | Antifoam | *** |
| | Fragrances | Fragrance | *** |

Example ***

(THERAWORX ® PROTECT Wound Healing Foam Formulation)

| Ingredient Category | Ingredient | Function | Wt. % |
|---|---|---|---|
| | Carbolicum Acidum 2X | Sloughing | *** |
| | Hamamelis Virginiana | Opening Wounds | *** |
| (l) | Olibanum 8X (Plant Based) | Anti-Inflammatory | *** |
| | Marigold Tinture | | *** |
| | Water | Diluent | *** |
| | Aloe Barbadenis Leaf | Antioxidant | *** |
| | Citric Acid | Buffer | *** |
| (h) | Diglycerin | Moisturizer | *** |
| (b) | Allantoin | Skin Protectant | *** |
| (h) | Decyl Glucoside | Emulsifier | *** |
| | Tetrasodium EDTA | Chelating Agent | *** |
| (c) | PEG/PPG-4/12 Dimethicone | Refatting Properties | *** |
| (k) | Potassium Sorbate | Preservative | *** |
| (f) | Collodial Silver (120) | Antimicrobial | *** |
| | Tocopheryl Acetate | Antioxidant | |
| | Sopalteric C | Foam Boosting | *** |
| | ABS Tumeric Root Extract | Wound Healing | |
| (l) | Croton Lechleri Resin | Anti-Inflammatory | *** |
| (h) | ABS Aloe Beta Glucan | Revitalize Skin | *** |
| | Fragrances | Fragrance | *** |

Example ***

(THERAWORX ® PROTECT Antimicrobial Peptide Containing Formulation)

| Ingredient Category | Ingredient | Function | Wt. % |
|---|---|---|---|
| | Water | Diluent | |
| | Aloe Barbadenis Leaf Extract | Antioxidant | *** |
| | Citric Acid | Buffer | *** |
| (b) | Allantoin | Skin Protectant | *** |
| (h) | Decyl Glucoside | Emulsifying | *** |
| | Tetrasodium EDTA | Chelating Agent | *** |

-continued

(THERAWORX ® PROTECT Antimicrobial Peptide Containing Formulation)

| Ingredient Category | Ingredient | Function | Wt. % |
|---|---|---|---|
| (c) | PEG/PPG-4/12 Dimethicone | Refatting Properties | *** |
| (k) | Potassium Sorbate | Preservative | *** |
| (f) | Colloidal Silver | Antimicrobial | *** |
|  | Tocopheryl Acetate | Antioxidant | *** |
|  | Sopalteric CS | Foam Boosting | *** |
|  | MultiMoist CLR | Vitamin D Booster | *** |
| (m) | ProRenew Complex | Cathelicidin (LL-37) | *** |
|  | ABS Aloe Beta Glucan | Revitalize Skin | *** |
|  | Fragrances | Fragrance | *** |

Example ***

(Corona Antivirus Effectiveness of THERAWORX® PROTECT® Versus a 62% Alcohol Solution)

A trial, using THERAWORX® PROTECT®, an antiseptic product manufactured and sold by Avadim Health, Inc. of Asheville, NC was conducted in a research laboratory by Biosciences Laboratories, Inc. in Bozeman, Montana. The purpose of the trail was to evaluate the virucidal protection offered by THERAWORX® PROTECT® against the human corona virus (viral strain OC43). The corona virus belongs to a family of viruses known as corona viridae having four major genera that are closely related (i.e. corona virus alpha, corona virus beta, corona virus delta, and corona virus gamma) These viruses are large enveloped viruses containing single stranded positive sense RNA that cover the virus core. The viral envelopes are comprised of lipids that originate from the infected host. The formulations effective against one strain of the enveloped virus representing the virus family is extremely likely to be effective against the whole virus family. Therefore, regulating agencies such as the US EPA and Health Canada created a list of surrogate viruses that possess equivalent susceptibility and belong to the same virus family as the virus desired for evaluating a disinfectant or antiseptic for efficacy. The difference in strain of the corona viruses is their pathogenicity, where some of the viral strains cause mild respiratory illness and other severe sickness and can be lethal. Therefore, the testing was conducted using a safer to work with OC43 virus strain (a beta corona virus) rather than the corona virus strain responsible for producing a COVID-19 human disease condition.

The testing was based on the standard ASTM E1052-11, *Standard Test Method to Access the Activity of Microbiocides against Viruses in Suspension. All of the testing was performed in accordance with the GMPs as specified in* 21 CFR Part 58.

The percent and log reduction from the initial population of the viral strain was determined following exposure to the test products for designated time intervals. The results showed and confirmed the superior efficacy of THERAWORX® PROTECT® over a 62% ethanol topical antiseptic product, as a waterless leave-on skin compatible topical antiviral formulation. The test results also demonstrated the ability of THERAWORX® PROTECT® to hydrate and restore dermal tissue to a healthy state during frequent use of conventional antiseptic actives as THERAWORX® PROTECT® was found to restore the natural microflora of the tissue as well as provide persistent antiviral activity.

As for the particular testing protocol used, five (5) healthy volunteers were identified having intact healthy skin on both forearms. The volunteers were attired in personal protective apparel/equipment (PPE) throughout the testing. The skin areas on both forearms of each volunteer were sanitized, disinfected and marked for application of the test product. The test products were carefully applied to the marked areas of the skin, one on each forearm. At 15 minute, 30 minute, 60 minute, 120 minute and 180 minute intervals, a known quantity of the OC43 viral agent was applied to a 3 cm×4 cm area on both forearms. After a five minute period, the area was swabbed with polyester swabs moistened in a salt solution, twice on each forearm. Using established methods, comparison of the viral load of the test media versus that seen in swabs used five minutes after application were compared.

The testing results show that both the early and residual activity of THERAWORX® PROTECT® against the corona virus in reducing viral concentration on human skin tissue was superior to the 62% alcohol solution. At the 15 minute post-application mark, the inoculated viral load of the swab was reduced by at least ninety percent (90%) on all 5 volunteer subjects with THERAWORX® PROTECT® versus an average of sixty-nine percent (69%) for the ethanol solution. At each of the subsequent four time period intervals, the average viral load reduction on the elbow (via the swab viral containing measurement) was also greater with THERAWORX® PROTECT®, with the greatest difference being at the 180 minute time interval, when 4 out of 5 volunteer subjects showed no reduction in viral load on the elbow 5 minutes after inoculation of the swab with the 62% alcohol solution, compared to an average reduction in viral load on the THERAWORX® PROTECT® elbow of over 55%. The results of the testing are shown in Table 1 below:

TABLE 1

|  | Time Frame (Minutes) | | | | |
|---|---|---|---|---|---|
|  | 15 | 30 | 60 | 120 | 180 |
| Volunteer 1 | | | | | |
| Theraworx ® Effectiveness (Log Reduction) | 98.22% | 99.00% | 94.38% | 82.2% | 82.22% |
| Alcohol Effectiveness (Log Reduction) | 68.38% | 82.22% | 43.77% | 0% | 0% |
| Volunteer 2 | | | | | |
| Theraworx ® Effectiveness (Log Reduction) | 90.00% | 90.00% | 68.38% | 43.77% | 0% |
| Alcohol Effectiveness (Log Reduction) | 43.77% | 0% | 0% | 0% | 0% |
| Volunteer 3 | | | | | |
| Theraworx ® Effectiveness (Log Reduction) | 99.00% | 98.22% | 98.22% | 68.38% | 43.77% |
| Alcohol Effectiveness (Log Reduction) | 82.22% | 0% | 68.38% | 43.77% | 68.38% |
| Volunteer 4 | | | | | |
| Theraworx ® Effectiveness (Log Reduction) | 98.84% | 90.00% | 0% | 0% | 68.38% |
| Alcohol Effectiveness (Log Reduction) | 68.38% | 68.38% | 43.77% | 0% | 0% |
| Volunteer 5 | | | | | |
| Theraworx ® Effectiveness (Log Reduction) | 99.44% | 94.38% | 68.38% | 82.22% | 68.38% |
| Alcohol Effectiveness (Log Reduction) | 82.22% | 0% | 0% | 43.77% | 0% |

In evaluating the test results, the researchers of Biosciences Laboratories, Inc. commented on the viability, potential widespread market use and acceptance of the THERAWORX® PROTECT® product. The following are their comments:

With the importance of skin disinfection of the hands currently elevated because of the COVID-19 viral pandemic, the identification of effective alternatives to alcohol sanitizers can be an answer to the problems associated with alcohol-containing products. In addition to the skin drying and cracking that can result in changes to normal skin flora and open the door to more frequent colonization by staphylococci and gram-negative bacilli, there is also the concern of unintended pediatric ingestions. Ethanol-based hand sanitizers can cause poisoning if a person swallows more than two mouthfuls. U.S. poison control centers received nearly 85,000 calls between 2011 and 2015 about hand sanitizer exposures among children. Emergency rooms nationwide have seen instances of both intoxication and hypoglycemia in children, and older children have been known to swallow hand sanitizers to become intoxicated purposely.

Another challenge with the use of alcohol-based hand sanitizers is that they present a significant flammability hazard, both in liquid form and as a vapor that can bleed of at higher temperatures. Alcohol-based hand sanitizers are classified as Class I Flammable Liquid substances, which means they have a flash point of less than 100 degrees Fahrenheit. If hand sanitizer combusts, carbon monoxide can form. While in response to the COVID-19 pandemic, U.S. airlines are now being allowed to distribute alcohol hand sanitizers to passengers, a May 19, 2020 letter from the U.S. Department of Transportation to the American Airlines Company, outlined specific requirements for fire safety relating to these products, including limiting products brought aboard, spreading the storage of the products across several locations, and limiting quantities distributed to passengers. In contrast, the THERAWORX® PROTECT® product does not contain any alcohol and is nonflammable. The THERAWORX® PROTECT® product also has another significant advantage over sanitizer products that contain alcohol, as it can be used safely around mucous membranes. COVID-19 has made the public more aware of the importance of avoiding touching the face with one's hands, because of the possibility of transferring viral particles into the mouth, nose, eyes, the entry points for respiratory viral infections. The THERAWORX® PROTECT® product can be used not just as hand disinfectant, but also can be used frequently on and around the mucous membranes of the face. The formula for the THERAWORX® PROTECT® product is non-stinging to the eyes and non-toxic to even the mucous membranes of the nose and mouth. The product can offer "T-zone" disinfection in addition to hand disinfection, with a single product. And, because, and it also helps maintain the low pH condition of healthy skin, it can be used frequently without the potential for skin damage or drying over time.

The viral log reductions shown in the study can be contrasted to other studies on viral log reduction in two significant ways. First, many studies on viral load reduction are done in in-vitro models, looking at a log reduction in virus-containing solutions. Historically, testing done on the same agent I such in-vitro models versus skin models shows significant greater log reduction in the in-vitro models. In fact, any greater than 1 log reduction of viral load on a skin model is deemed very significant. Second, studies showing 3 log reductions in viral load typically utilize a 10 to 1 dilution in the initial viral inoculation, versus study performed in this case where there was no dilution in viral load in the initial inoculation.

The study attempted to at least match the realistic potential exposure events that can be experienced by those in the presence of an infected COVID-19 patient. While, depending on the disease, as few as 10 individual virus particles can cause infection, typical transmission events involve from 1,000 to 5,000 isolates. The study involved five instances of redinoculation of viral loads at a much higher level than the typical transmission event, and with lower transmission loads, should be seen to be even more effective in load reduction to safer levels.

The potential advantage of using THERAWORX® PROTECT® in public health preventative practices associated with the COVID-19 pandemic would seem to be significant, based on the results of the test. With some recent studies showing a relationship between COVID-19 disease severity and viral load at transmission, the ability to reduce viral load on the skin may have a positive impact on disease severity and therefore mortality. More importantly, since COVID-19 infectious agents enter the body through the mucous membranes of the face-eyes-nose- or mouth, the potential of having a safe and effective "face sanitizer" which is also a more effective hand sanitizer, offers a new potential agent to help in the fight against not only COVID-19, but also influenza and other respiratory viruses and bacteria.

What is claimed is:

1. A composition for treating the surface of inflamed chronically infected mammalian tissue, consisting of:
    at least one ingredient selected from each of the following categories: an amphoteric surfactant category (a) ingredient having a wt % from about 2.0 to about 8.0 wt. %, a skin compatible anti-inflammatory category (b) ingredient having a wt % from about 6.0 to about 12.0 wt. %, and a skin compatible anti-foaming category (c) ingredient having a wt % from about 0.19 to about 0.27 wt. %;
    at least one ingredient selected from each of the following categories: a cell growth promoting category (d) ingredient having a wt % from about 4.0 to about 10.0 wt. %, an immune system enhancing category (e) ingredient having a weight percentage from about 2.0 to about 5.0 wt. %, a fast acting skin compatible antimicrobial category (f) ingredient having a weight percentage from about 2.0 to about 10.0 wt. %, an absorption facilitation category (g) ingredient having a weight percentage from about 0.5 to about 5.0 wt. %, a humectant and emollient category (h) ingredient having a weight percentage from about 2.0 to about 11.0 wt. %, a free radical scavenging category (i) ingredient having a weight percentage from about 4.0 to about 8.0 wt. %, and a healing promoting category (j) ingredient having a weight percentage from about 2.0 to about 4.0 wt. %;
    a biocompatible preservative category (k) ingredient of potassium sorbate having a weight percentage from about 0.01 to about 0.10 wt. %; and a plant based extract category (l) ingredient of olibanum (frankensense) having a weight percentage from about 0.009 wt. % to about 5.0 wt. %; with the balance of the composition being approximately 70 to 90 wt. % water;
    wherein the composition has an acidic pH of from 4.0 to 5.0, is gamma irradiated at 4 kGY to 35 kGY to a sterility assurance level of $10^{-2}$ to $10^{-6}$, and provides the hybrid benefits of: (1) treating microbials, (2) treating biofilms, (3) maintaining, nourishing and moisturizing, (4) maintaining the natural pH; (5) maintaining and promoting immunocompetency, and (6) protecting and preserving barrier function of the tissue's stratum corneum.

2. The composition of claim 1 wherein the category (a) ingredient is selected from the group consisting of cocamidopropyl betaine, cocamidopropyl hydroxysultaine, betaine alkyl glucosides, laurylglucosides, and combinations thereof; the category (b) ingredient is selected from the group consisting of aloe vera, allantoin, cocamidopropyl betaine, and mixtures thereof; the category (c) ingredient is selected from the group consisting of silicone-based antifoaming agents, dimethicone copolyol; the category (d) ingredient is selected from the group consisting of aloe vera, allantoin, beta glucan, a bioflavonoid, a polyphenolic compound, a grapefruit derived quaternary compound, and mixtures thereof; the category (e) ingredient is selected from the group consisting of aloe vera, beta glucan, colloidal silver, allantoin and mixtures thereof; the category (f) ingredient is selected from the group consisting of hepar sulphuris, camphor calcareum, xylitol, polyglyceryl-2-laurate, octenidine hydrochloride, *Eucalyptus globulus*, colloidal silver, a bioflavonoid, a polyphenolic compound, a grapefruit derived quaternary compound, grapefruit extract, and mixtures thereof; the category (g) ingredient is selected from the group consisting of beta glucan, aloe vera, colloidal silver, and mixtures thereof; the category (h) ingredient is selected from the group consisting of aloe vera, vitamin E, cocamidopropyl betaine, glycerin, fructooligosaccharides, decyl glucoside, diglycerin, *Beta vulgaris* root extract and mixtures thereof; the category (i) ingredient is selected from the group consisting of a bioflavonoid, a polyphenolic compound, a grapefruit derived quaternary compound, beta glucan, allantoin, vitamin E, *Lactococcus* ferment lysate, and mixtures thereof; the category (j) ingredient is selected from the group consisting of aloe vera, allantoin, beta glucan, and mixtures thereof.

3. The composition of claim 2, wherein the composition does not contain grapefruit derived quaternary compounds.

4. The composition of claim 2, wherein the composition does not contain a beta glucan.

5. The composition of claim 1 as a foam.

6. The composition of claim 1 as a spray.

* * * * *